US010896439B1

(12) United States Patent
Jogia et al.

(10) Patent No.: US 10,896,439 B1
(45) Date of Patent: Jan. 19, 2021

(54) GENERATING CONTENT DELIVERY CAMPAIGNS WITH DYNAMIC FUNCTIONALITY FOR SINGLE-ACTION EXECUTION

(71) Applicant: Amazon Technologies, Inc., Seattle, WA (US)

(72) Inventors: Sachin Jogia, Seattle, WA (US); John Andrew Brauer, Jersey City, NJ (US); Guthrie Chipman Collin, New York, NY (US); Vasanth Ebenezer Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 15/272,921

(22) Filed: Sep. 22, 2016

(51) Int. Cl.
   *G06Q 30/02* (2012.01)
(52) U.S. Cl.
   CPC ..... *G06Q 30/0249* (2013.01); *G06Q 30/0242* (2013.01)
(58) Field of Classification Search
   CPC ....................................... G06Q 30/00–30/0284
   USPC .............................................. 705/14.1–14.73
   See application file for complete search history.

(56) References Cited

U.S. PATENT DOCUMENTS

| 5,548,654 | A | 8/1996 | Fast |
| 7,996,753 | B1 * | 8/2011 | Chan .................. G06Q 30/0263 |
| | | | 715/200 |
| 9,462,340 | B1 | 10/2016 | Mathurin |
| 9,641,919 | B1 | 5/2017 | Poole |
| 10,528,977 | B1 | 1/2020 | Jogia et al. |

(Continued)

FOREIGN PATENT DOCUMENTS

WO  2019/040307 A1  2/2019

OTHER PUBLICATIONS

Gatarski et al., "Breed Better Banners: Design automation through on-line interaction", 2002, Journal of Interactive Marketing, 16 (12) (2002), pp. 2-13 (Year: 2002).*

(Continued)

*Primary Examiner* — John Van Bramer
(74) *Attorney, Agent, or Firm* — Eversheds Sutherland (US) LLP

(57) ABSTRACT

Systems, methods, and computer-readable media are disclosed for generating content delivery campaigns with dynamic functionality for single-action execution. In one embodiment, an example method may include receiving an indication of a selection of a campaign goal for a content delivery campaign, determining a user account associated with the selection, and generating a product recommendation for the content delivery campaign. Some example methods may include generating a target consumer recommendation for the content delivery campaign based at least in part on the campaign goal and historical data associated with the user account, generating a digital product type recommendation, and generating a creative recommendation for digital impressions of the content delivery campaign. Example methods may include causing presentation of a content delivery campaign package at a user device, determining that a user performed a single-action in response to the presentation of the content delivery campaign package, and initiating the content delivery campaign.

20 Claims, 13 Drawing Sheets

(56) References Cited

U.S. PATENT DOCUMENTS

| | | | |
|---|---|---|---|
| 2011/0040636 A1* | 2/2011 | Simmons | G06Q 30/0243 705/14.71 |
| 2011/0087529 A1* | 4/2011 | Angell | G06Q 30/0236 705/14.13 |
| 2011/0122623 A1 | 5/2011 | Miura | |
| 2011/0235281 A1 | 9/2011 | Mittleman | |
| 2013/0193465 A1 | 8/2013 | Xu et al. | |
| 2014/0053212 A1 | 2/2014 | Shoykher et al. | |
| 2014/0074627 A1* | 3/2014 | Kucharz | G06Q 30/02 705/14.72 |
| 2014/0304063 A1* | 10/2014 | English | G06Q 30/0243 705/14.42 |
| 2015/0022620 A1 | 1/2015 | Siminoff | |
| 2015/0331449 A1 | 11/2015 | Ng | |
| 2016/0071162 A1* | 3/2016 | Ogawa | G06Q 50/01 705/14.66 |
| 2017/0093031 A1 | 3/2017 | Svendsen et al. | |
| 2017/0206900 A1 | 7/2017 | Lee et al. | |
| 2019/0069058 A1 | 2/2019 | Lemons et al. | |

OTHER PUBLICATIONS

Product Description for AnyMote Home, <http://www.anymote.io/>, Accessed Nov. 29, 2017; 5 pages.

International Search Report and Written Opinion dated Nov. 2, 2018 for PCT/US2018/046511 filed Aug. 13, 2018; 8 pgs.

\* cited by examiner

GENERATING CONTENT DELIVERY CAMPAIGNS WITH DYNAMIC FUNCTIONALITY FOR SINGLE-ACTION EXECUTION

BACKGROUND

Content may be presented on electronic devices to users such that users can consume the content. Users may consume or interact with certain content while other content may not be consumed or interacted with. Similarly, certain users may interact with certain content, while other users may not interact with the same content. However, set up of a content delivery campaign may be cumbersome and may include multiple steps or inputs that may result in content delivery settings that are not optimal. Content delivery campaigns may be manually monitored over time to make adjustments to content delivery settings in order to improve performance of the campaign. Content creators may desire to initiate content delivery campaigns with a reduced amount of input and/or allocate resources on delivering content to users that will or will likely interact with the content so as to improve campaign performance.

Figure 1:
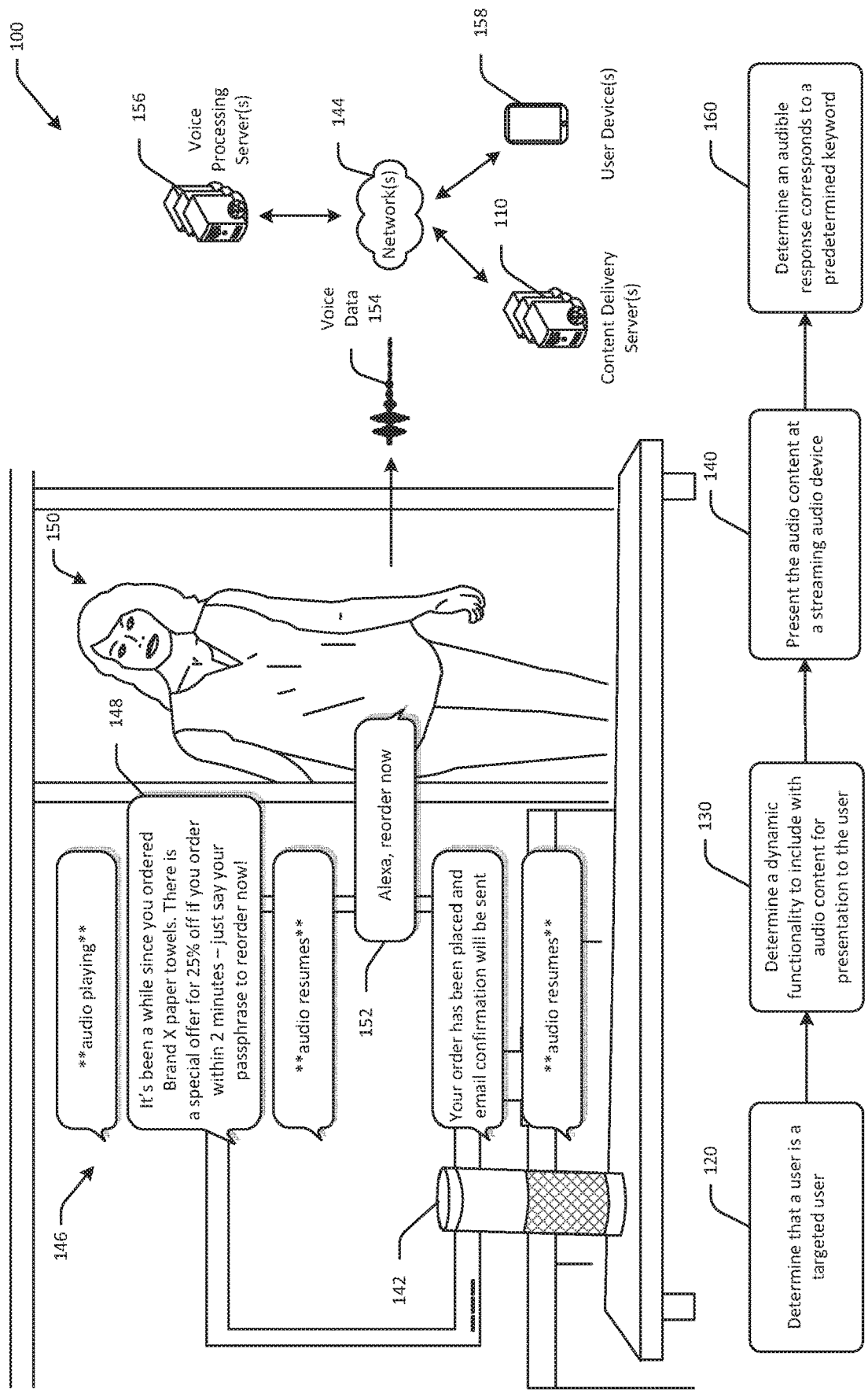
FIG. 1 is a hybrid system and process diagram illustrating generating content delivery campaigns with dynamic functionality for single-action execution in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume the digital content. Content for delivery may be provided by content creators who desire for the content to be consumed or interacted with by users. Content delivery campaigns may be initiated by content creators or content providers, or related third parties, and may be set up or otherwise initiated by input or selection of a number of delivery settings. For example, content may be targeted to specific users or types of users and/or to specific types of devices. In some instances, users may not consume or interact with content, and may instead navigate away from or otherwise skip content that is presented rather than consuming or interacting with the content. Content creators or other interested parties may desire to deliver content to users that may likely interact with the content, so as to improve campaign performance. To set up or initiate a content delivery campaign, content creators may also input a flight time or length of the campaign, provide creative materials or content for delivery, input a budget and respective allocations to various content, distribution channels, and/or other aspects of the campaign. Accordingly, set up or initiation of a content delivery campaign may be cumbersome and time consuming. Moreover, in some instances, initial delivery settings may not be optimal due to the selection or input of non-optimal delivery settings.

Embodiments of the disclosure may automatically generate one or more portions of a content delivery campaign. In some embodiments, a user, such as a media agency, trading desk, campaign creator, etc., may select a campaign goal for the campaign. Examples of campaign goals might be to increase brand awareness of a particular brand, increase sales, increase traffic, increase membership to a listserv, increase subscriptions, increase or improve customer engagement, and other goals. Based at least in part on a campaign goal, embodiments of the disclosure may generate a ready-to-implement content delivery campaign. For example, embodiments of the disclosure may generate one or more of distribution channel recommendations (e.g., content on specific channels, audio content, digital content, etc.), budget recommendations, budget allocation recommendations, product identifier recommendations, flight time recommendations (e.g., start and end dates, length of a campaign, etc.), digital product type recommendations, targeting segment recommendations, dynamic functionality recommendations, automatically generated creative material recommendations, and/or other recommendations for a content delivery campaign that may otherwise have to be input or determined by a user. In some embodiments, campaign goal recommendations may also be generated for specific users or user accounts based at least in part on a historical account performance. The user may review recommendations generated by embodiments of the disclosure, and may take a single-action, such as one-click, one-tap, or another single gesture, to initiate the content delivery campaign. In some embodiments, the user may be unable to modify one or more of the recommendations prior to initiating the content delivery campaign. In other embodiments, the user may be able to modify one or more of the recommendations before initiating the campaign.

After the single-action is completed by the user, or an indication of the single-action is determined, the content delivery campaign may be initiated, thereby reducing a number of inputs and/or steps a user takes to initiate a content delivery campaign. In some embodiments, a user may only have to input or select a campaign goal at a first user interface, then at a second user interface (which may be immediately subsequent to the first user interface, or which may be presented after the campaign goal selection), the user may perform the single-action or may otherwise provide approval of the recommendations, resulting in initiation of the content delivery campaign.

Embodiments of the disclosure may generate one or more content delivery campaign recommendations using, in one example, machine learning algorithms, where the recommendations may be specific to a user or user account. For example, content delivery campaign recommendations may be based at least in part on historical sales data associated with a user account and/or historical sales data associated with a competitor account, as well as other factors. Embodiments may automate a process spanning, for example, pre-flight planning to execution of link-in content delivery campaigns. Example recommendations generated by embodiments of the disclosure may include digital product inventory forecasts and selection recommendations; budget allocation recommendations for different recommended platforms; product recommendations; creatives' generation and recommendations; targeting recommendations; and/or other recommendations for a content delivery campaign. Recommendations may be generated or determined based at least in part on browsing data, user intent data, purchase data, and other information. Embodiments of the disclosure may optimize content delivery campaign performance based at least in part on a campaign goal.

This disclosure relates to, among other things, systems, methods, computer-readable media, techniques, and methodologies for generating content delivery campaigns with dynamic functionality for single-action execution. Embodiments may generate content delivery campaign recommendations that include recommendations for one or more content delivery settings. Content delivery campaigns can be executed or otherwise initiated with a single-action, such as one-click, or with minimal input by a user. Recommendations may be based at least in part on historical data and may be generated by one or more machine learning algorithms. As a result, content delivery campaigns may be more effective, and performance may therefore be improved, while user input and/or active management may be reduced.

Referring to FIG. 1, an example use case 100 illustrating generating content delivery campaigns with dynamic functionality for single-action execution is depicted. A content creator may interact with, for example, one or more content delivery servers 110 to initiate a content delivery campaign. The content delivery server 110 may receive a campaign goal from the content creator or another user and may generate one or more recommendations for some or all aspects of a content delivery campaign. For example, the content delivery server 110 may recommend audio content distribution as a distribution channel, as well as other distribution channels, based at least in part on forecasted inventory and/or a global budget for the content delivery campaign. The content delivery server 110 may also recommend targeting segments for users or groups/types of users to target, as well as recommendations of dynamic functionality. The content creator may approve or initiate the content delivery campaign by executing a single-action, such as one-click or a single click, tap, phrase, gesture, or other single device interaction. In the example of FIG. 1, the content delivery server 110 may recommend audio content as a portion of the content delivery campaign. Audio segments for delivery as impressions of audio content may also be generated in some embodiments.

After the content delivery campaign is initiated, content impressions of content associated with the content delivery campaign may be presented at various devices across one or more platforms. In one example, content impressions may be presented after an auction process is conducted for an available content slot to determine a winning bid where content associated with the winning bid is presented at the available content slot.

FIG. 1 depicts an example process flow for presentation of content in accordance with one or more embodiments of the disclosure. At a first operation 120, one or more remote servers, such as the content delivery server 110, may determine that a user is a targeted user. If the user is a targeted user, then the content delivery server 110 may participate in an auction process or another process for the right to present a content impression to the user. Users may be targeted based at least in part on characteristics, demographics, preferences, historical actions such as browsing histories, search histories, purchase histories, and the like, as well as on geographic location, time of day, contextual information, and/or other factors. The content impression may be any suitable content impression, such as a digital impression presented at a device display; an audio content impression; or another type of impression. In the example of FIG. 1, the content impression may be an audio content impression.

At operation 130, a dynamic functionality to include with audio content for presentation to the user may be determined, for example, by the content delivery server 110. Dynamic functionality may include portions of digital content that may be determined specifically for certain users, and may be different for different users or different impressions. For example, a digital impression of content associated with a content delivery campaign may include dynamic functionality that may be determined based at least in part on the device and/or user at which the impression is being delivered. Examples of dynamic functionality may include initiating a discount; initiating a subscription; initiating a download or browser redirection; selection of a promotional offer for presentation or association with the digital impression; and other dynamic functionality.

At operation 140, the audio content may be presented at a streaming audio device. For example, the content delivery server 110 may communicate with a streaming audio device 142 via one or more networks 144. Some or all of the audio content may be predetermined, or some or all of the audio content may be generated in real-time or near real-time. For example, a portion of the audio content may be automatically generated creative that was approved by a content creator, while another portion, such as a promotional offer, may be selected or determined based at least in part on a specific user or device at which the promotional offer is to be presented.

In the example of FIG. 1, the streaming audio device 142 may be configured to present audio 146, such as music, news, weather information, or other audible content to a user 150. Available content slots may allow for presentation of audio content in between segments of audio presented at the streaming audio device 142. For example, the user 150 may be streaming music or other audio, and at pauses or breaks in between the music, audio content may be presented. The streaming audio device 142 may be configured to present audible content and may be, for example, a device such as a television, a laptop computer, a tablet, a computer monitor, a speaker-type device, augmented reality or virtual reality glasses or devices, or another device configured to output audio. The streaming audio device 142 may include or may utilize a speech interface device or other audio device, such as one or more speakers, that are capable of playing or presenting various types of audio. The streaming audio device 142 may include one or more microphones to detect ambient sound. The streaming audio device 142 may operate in conjunction with and/or under the control of a remote network-based speech command service (e.g., voice processing server(s) 156, content delivery server(s) 110, etc.) that is configured to receive audio; to recognize speech in the audio; and to perform functions or services in response to the recognized speech, or to generate audible dialog or audible content in response to recognized speech. The streaming audio device 142 may have one or more microphones and one or more audio speakers or transducers to facilitate speech interactions with the user 150. The streaming audio device 142 may receive spoken expressions or utterances from the user 150 and may provide services, perform actions, or facilitate conversation or dialogue in response to the spoken utterances. For example, the user may speak an utterance with a verbal request. In some embodiments, the streaming audio device 142 may only be activated to listen upon determining that the user 150 has spoken a predefined wake or trigger expression (e.g., "Awake" or "Alexa," etc.), that may be followed by an utterance (e.g., "I'd like to order a taxi."). Provided services may include performing actions or activities, rendering media, obtaining and/or providing information, providing information via generated or synthesized speech via the streaming audio device 142, initiating Internet-based services on behalf of the user 150, performing actions relating to home automation and control, and so forth.

In FIG. 1, audio content 148 with dynamic functionality may be presented at the streaming audio device 142. The audio content 148 may include a promotional offer or other functionality that was dynamically selected. For example, the streaming audio device 142 may present audio content 148 that audibly states "It's been a while since you ordered Brand X paper towels. There is a special offer for 25% off if you order within 2 minutes—just say your passphrase to reorder now!" The promotional offer of 25% off may be specific to the user, and other users may receive different discounts, or entirely different functionality, such as free shipping offers, discounted subscription offers, or other functionality. The audio content 148 may be a text-to-audio transcription of text-based content, or other audio content, such as a jingle associated with an advertiser, a news clip, a recipe, or other audio content. While FIG. 1 illustrates audio content being presented, other embodiments may include digital content impressions presented at a device display, such as at a smartphone, laptop, watch, glasses, or other accessory, and/or a device display.

In some embodiments, the user 150 may interact with the streaming audio device 142 by providing analog sound input (e.g., voice) to the streaming audio device 142. The streaming audio device 142 may receive or detect the analog sound input and may generate digital voice data 154 representative of the analog sound input. While FIG. 1 illustrates an embodiment where audible content 120 is presented during user interaction with a voice assistant, in other embodiments, audible content may be presented during third party content presentation, such as during a streaming music playlist or other third party content.

In some embodiments, such as in the example of FIG. 1, users may have a predetermined time interval in which to accept a promotional offer or in which to otherwise act in response to a digital content impression. For example, in FIG. 1, the user 150 may have two minutes to reorder paper towels and receive the 25% discount. In other embodiments, the digital impression may not include a promotional offer or the promotional offer may not be time-based or have a predetermined end. After the audio content 148 is presented, the streaming audio device 142 may return to presenting other audio, or may be silent and/or await a command. In FIG. 1, the streaming audio device 142 may have been playing music prior to presenting the audio content 148. After the audio content 148 is presented, the streaming audio device 142 may return to playing music or other content that was interrupted by the audio content 148. As a result, if the user 150 is not interested in the audio content 148 and/or promotional offer, the user 150 may not have to interact with the streaming audio device 142 or actively state that they are not interested; the original content may simply resume playback.

If, however, the user 150 is interested, for example, in reordering the paper towels, the user 150 can interrupt playback of audio at the streaming audio device 142. The user 150 may state a passphrase or may otherwise affirm a reorder, either via verbal or other input at the streaming audio device 142. For example, the user 150 may say "Alexa, reorder now" in an audible response 152, and an order for the Brand X paper towels may be initiated. In some embodiments, the user 150 may not need to take any other action to complete the order. In certain embodiments, the user 150 may have a verbal passphrase or passcode to prevent unauthorized orders being placed on a user account associated with the streaming audio device 142. The streaming audio device 142 may audibly confirm placement of the order and may resume, in some instances, audio playback of the content that was originally being presented. In some embodiments, order confirmation may be sent to a user device 158 in addition to, or instead of, audible confirmation.

At operation 160, an audible response may be determined to correspond to a predetermined keyword. For example, the audible response 152 may be packaged as voice data and sent to one or more voice processing servers 156 via the one or more networks 144. The voice processing server 156 may determine a meaning of the voice data 154, for example via natural language processing and/or speech-to-text translation, or a combination thereof. The meaning may be communicated to the content delivery server 110, which may determine that the user's audible response of "Alexa, reorder now" corresponds to a predetermined keyword that may be specific to the user 150 and/or the streaming audio device 142. The predetermined keyword may be a verbal password and/or a word or phrase associated with allowing access to a user account. As a result of determining that the audible response corresponds to the predetermined keyword, the order of the paper towels may be initiated, and the streaming audio device 142 may present audible confirmation of the order. The originally playing content, if any, may resume. In some embodiments, the streaming audio device 142 may perform some or all voice processing functionality on the voice data 154 locally.

The systems, methods, computer-readable media, techniques, and methodologies for generating content delivery campaigns with dynamic functionality for single-action execution may generate content delivery campaigns that can be executed or initiated via a single-action by a user. In some embodiments, entire content delivery campaigns can be generated based at least in part on a single input of a campaign goal. Content associated with campaigns may include dynamic functionality that can be tailored at the time of, or prior to, delivery of a content impression and can be based at least in part on contextual and/or user-specific data. Embodiments of the disclosure may automatically generate and format creative materials for content delivery campaigns, including creatives for different formats and platforms, including audio content and image-based content.

Example embodiments of the disclosure provide a number of technical features or technical effects. For example, in accordance with example embodiments of the disclosure, certain embodiments of the disclosure may provide audio channels for targeted audio content, dynamic determination of e-commerce functionality, digital content with dynamic functionality, and single-action executable content delivery campaigns. Due to the serial workflow of audio content, in that singular audio content may be presented at a time (e.g., two songs cannot be played at once, etc.), presentation of audio content is distinguished from visual or graphic content. As a result, interaction with audio content, such as audio advertisements, is also distinguished from visual content. Embodiments of the disclosure may generate audio content, such as audio content or advertisements, as well as other forms of visual content, for delivery during a content delivery campaign. Embodiments of the disclosure may manage campaign performance and optimize delivery settings to improve campaign performance over the flight time of a campaign. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
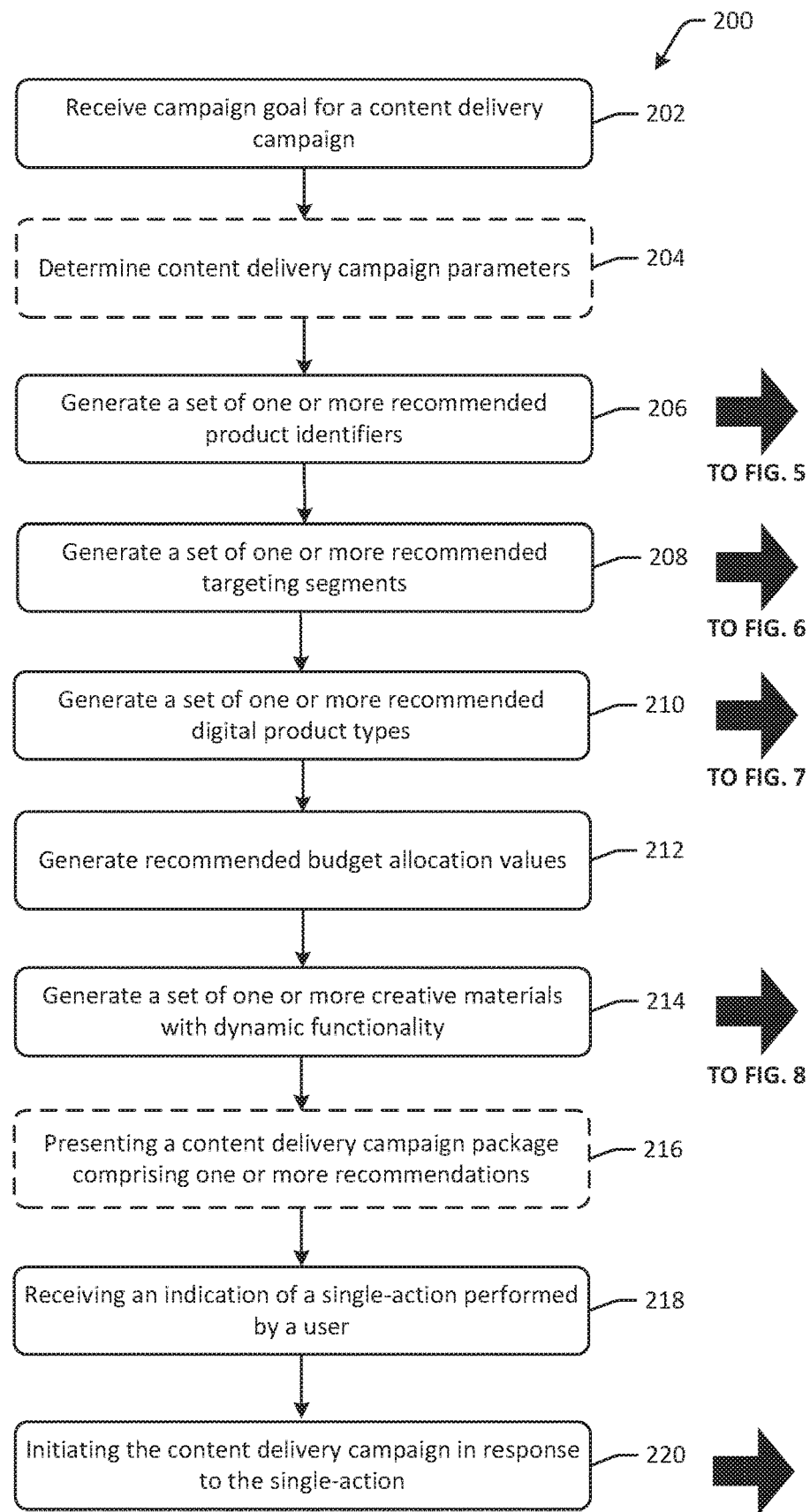
FIG. 2 is an example process flow diagram for generating content delivery campaigns with dynamic functionality for single-action execution in accordance with one or more embodiments of the disclosure.
Figure 3:
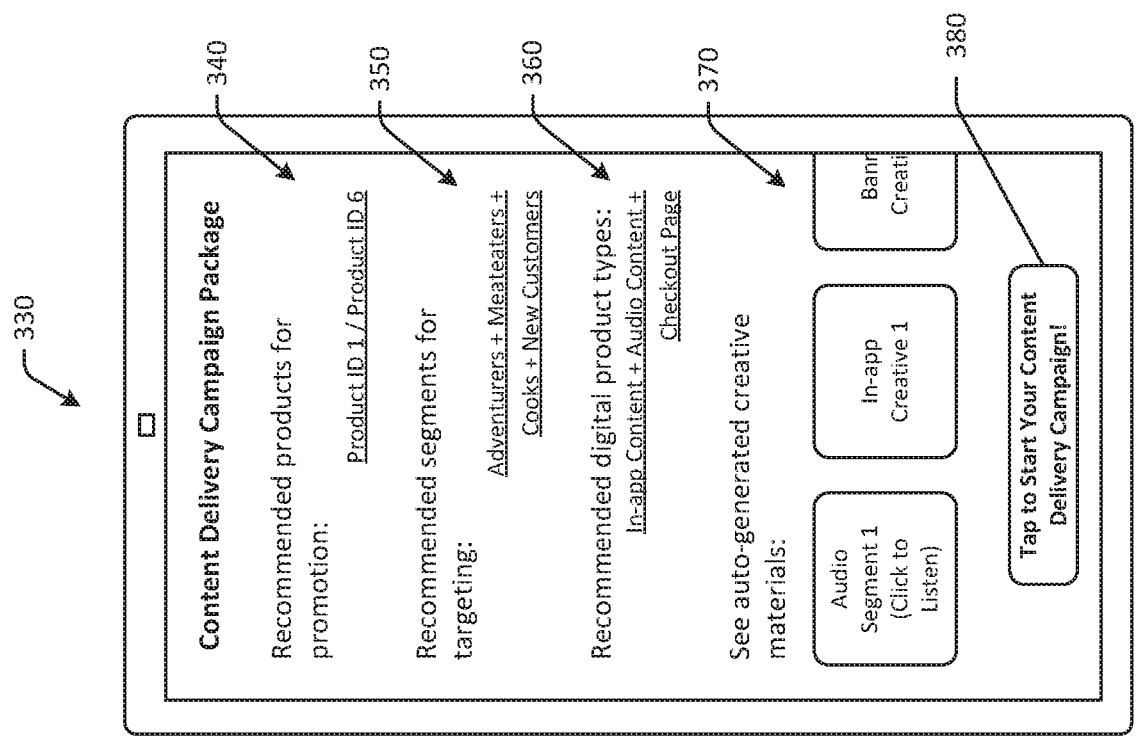
FIGS. 3-4 are example user interfaces for generating content delivery campaigns with dynamic functionality for single-action execution in accordance with one or more embodiments of the disclosure.
Figure 3:
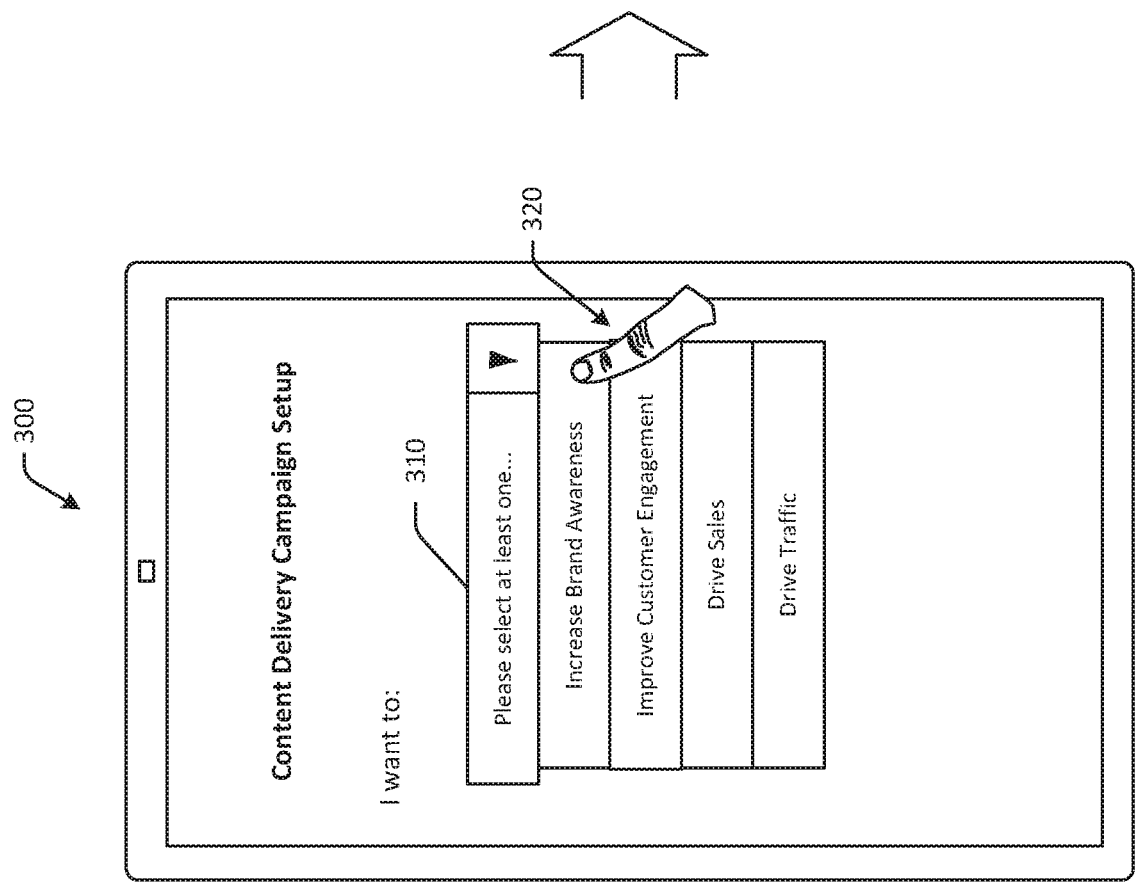
Figure 4:
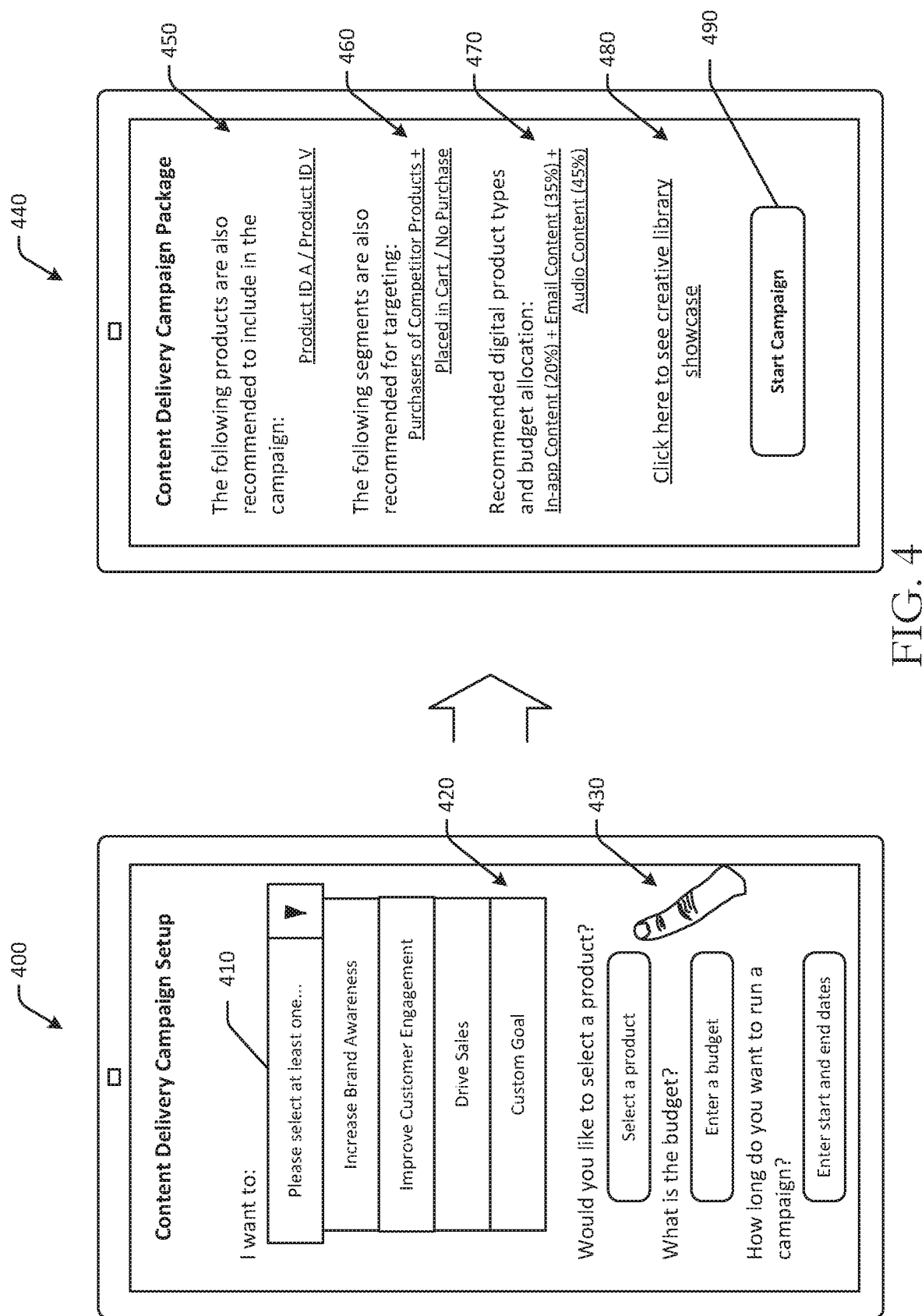

Referring to FIG. 2, an example process flow 200 for generating content delivery campaigns with dynamic functionality for single-action execution in accordance with one or more embodiments of the disclosure is depicted. Although certain operations are illustrated as occurring separately in FIG. 2, some or all of the operations may occur concurrently or partially concurrently across one or more computer systems. One or more operations may be optional in FIG. 2. FIGS. 3-4 depict example user interfaces for generating content delivery campaigns with dynamic functionality for single-action execution in accordance with one or more embodiments of the disclosure and will be discussed in conjunction with FIG. 2.

At block 202 of the process flow 200, a campaign goal for a content delivery campaign may be received. In some embodiments, a campaign goal may be recommended by embodiments of the disclosure rather than received from a user and/or user device. Campaign goals may be selected from preset options or may be input by a campaign manager or other user. For example, computer-executable instructions of one or more content delivery module(s) stored at a remote server may be executed to receive or otherwise determine a campaign goal. The campaign goal may be associated with a user account. The user account may be associated with a particular brand or company or other entity, and may be associated with one or more product identifiers of products made by or associated with the brand.

In FIG. 3, a first user interface 300 at a user device may present one or more selectable campaign goals 310. A user, such as a campaign manager, may log in or otherwise access the first user interface 300 and may select one or more of the selectable campaign goals 130. For example, the user may select a campaign goal of "increase brand awareness" 320.

At optional block 204 of the process flow 200, content delivery campaign parameters may be determined. Content delivery campaign parameters may include parameters such as budget values and allocations, start and/or end dates, flight time, product identifiers for feature or inclusion in the campaign, and other parameters. In some embodiments, some or all content delivery parameters may be received or determined based at least in part on user inputs, while in other embodiments, some or all content delivery parameters may be generated or determined as recommendations.

In some embodiments, users may be able to input or select more than just a campaign goal, such as content delivery campaign parameters. For example, in FIG. 4, a first user interface 400 may present one or more selectable campaign goals 410, including an option to "advise me", that may trigger generation of a campaign goal recommendation. Campaign goal recommendations may be determined for specific users based at least in part on a user profile and/or historical data associated with the specific user. The campaign goal recommendation may be generated by a remote server and may be determined based at least in part on any number of factors, including sales history for the brand associated with the user account, previous campaign performance, historical user strategy, historical and predicted brand health and positioning, and the like. The user may select one or more of the selectable campaign goals 410, or may input a custom campaign goal 420. The user may also input or select additional information 430, such as a product identifier for a product that is to be promoted or featured, for example, in creative materials (e.g. "would you like to select a product?", etc.), a budget amount for the campaign, as well as budget allocation values for different aspects of the campaign (e.g., "what is the budget?", etc.), a flight time of the campaign, or how long the campaign should run (e.g., "how long do you want to run a campaign?", etc.). Other embodiments may present additional, fewer, and/or different options for a content delivery campaign. In some embodiments, users may only be able to input a campaign goal or select a campaign goal from a set of predetermined campaign goals.

After the user selects or inputs a campaign goal, and any other inputs if available, a remote server, such as a content delivery server, may receive an indication of a selection of a campaign goal for a content delivery campaign. The content delivery campaign may include impressions that have dynamic functionality. The content delivery server may determine a user account associated with the selection of the campaign goal. In some embodiments, a global budget value for the content delivery campaign may be determined. For example, a user may input a global budget value for the campaign, or a global budget value recommendation may be determined. A campaign flight time and/or one or more product identifiers for the content delivery campaign may be determined in some embodiments. For example, the content delivery server may determine or receive a first product identifier for a first product that is to be associated with or featured in the content delivery campaign. The first product may be from a particular brand, such as a brand associated with the user account. In some embodiments, audio content and/or digital creative material for the product may be generated.

At block 206 of the process flow 200, a set of one or more product identifier recommendations may be generated. Product identifier recommendations may include one or more product identifiers for products that are recommended to be included in the content delivery campaign. For example, computer-executable instructions of one or more recommendation module(s) stored at a remote server may be executed to generate a set of one or more product identifier recommendations. Product recommendations may be products that are recommended for featuring in creative materials, products that should be promoted, products that should be discounted, and/or other products.

In some embodiments, product recommendations may be based at least in part a product that was selected or identified by the user. For example, a user may identify a product that is to be featured in a content delivery campaign. The content delivery server, or another device, may identify one or more products that are related to the identified product. The related products may be recommended for inclusion in the content delivery campaign. Product recommendations, which may be related products, may be identified based at least in part on a product category, a relationship between a product and a user account and/or a brand, competing brand, or manufacturer, or another relationship.

In some instances, user accounts may be associated with multiple product identifiers. For example, a brand may have a number of products associated with the brand. Embodiments of the disclosure may determine optimal products associated with the brand to promote or otherwise include in a content delivery campaign. For example, including a certain product may result in increased sales of the product, which may in turn cause the product to become a "bestselling" product or may otherwise result in increased exposure for the product in addition to the exposure gained from the content delivery campaign. The product may otherwise have remained just outside of the "bestselling" list if not for the promotion in this example. In another example, product recommendations may be based at least in part on current and/or forecasted inventory levels. For example, if a certain product has a relatively high inventory level, the product may be recommended for inclusion in the content delivery campaign, whereas if a product has a relatively low inventory level and will not be restocked during the content delivery campaign, that product may not be recommended to be included in the content delivery campaign. Products may be featured at different times during a campaign. For example, if a product will be restocked during a campaign, the product may be recommended to include or feature in the campaign after the product is restocked. Products may be recommended (or promotional offers associated with products may be adjusted) based at least in part on an estimated time of arrival of a product if a product has been reordered. Product recommendations may be determined or generated based at least in part on historical sales data for a particular product.

Product recommendations may be generated for users in response to selection of a campaign goal and/or in response to a product identified for inclusion in the content delivery campaign. The user may or may not initially select a product for inclusion in the content delivery campaign in some instances. Instead, product recommendations may be automatically generated based at least in part on the campaign goal. In other instances, a product selection for a product to include in the content delivery campaign may be received, for example, by the content delivery server. Products related to the product selection, such as parent, child, sibling, or other products, may be identified. Product recommendations may be determined based at least in part on the related products. For example, product identifiers of the related products may be filtered based at least in part on targeting criteria for the campaign, target segment recommendations, inventory levels, historical sales information, user inputs, and/or other filters. The filtered set of product identifier(s) may be recommended for inclusion or featuring in the content delivery campaign.

Product recommendations may be presented in a showcase format. For example, a grid or Venn diagram of product recommendations, along with additional data such as ratings, pricing, inventory, or other data, may be presented with product identifiers, such as product images or other identifiers. Product recommendations may include product identifiers associated with a particular user account.

In FIG. 3, a second user interface 330 may be presented. The second user interface 330 may be presented after the campaign goal selection and before the user has an opportunity to make any further inputs. In some embodiments, the second user interface 330 may be presented as the subsequent user interface to the first user interface 300. The second user interface 330 may include product identifiers recommended for promotion 340. For example, product ID 1 and product ID 6 may be identified as products to include in a promotion associated with the content delivery campaign. The recommended products may be presented with any suitable identifier, and may be presented as hyperlinks in some embodiments.

Similarly, in FIG. 4, a content delivery campaign package 400 may be presented at a second user interface 440 that may be presented after the selection of a campaign goal and any other inputs made by the user. In some embodiments, the second user interface 440 may include a recommended campaign goal. The second user interface 440 may include products recommended to include in the campaign, such as product ID A and product ID V. Any suitable product identifier may be used. The user may be able to select one or more of the recommended products for inclusion in the campaign and/or for a promotion. In some instances, the user may not be able to modify or select individual product recommendations.

At block 208 of the process flow 200, a set of one or more recommended targeting segments may be generated. Targeting segments may include groups or types of users and/or particular users to which content impressions associated with the content delivery campaign are delivered. Targeting content impressions to certain users and/or certain platforms may increase a likelihood that users will consume the content impression and/or interact with the content impression. In one example, computer-executable instructions of one or more recommendation module(s) stored at a remote server may be executed to generate a set of one or more targeting segment recommendations. Targeting segment recommendations may be based at least in part on the campaign goal, characteristics of the brand, previous content delivery campaigns and results associated with a user account, and/or historical data associated with accounts of competitors. For example, user interaction rates from historical campaigns of either a user account or a competitor account may be used to optimize targeting criteria so as to maximize campaign performance.

Targeting segments may be recommended based at least in part on brand characteristics. For example, active wear brands may be associated with particular lifestyle consumer segments, such as gym goers, active lifestyle segments, and the like. Certain demographics and/or geographic locations may also be included in targeting segment recommendations.

Target segment recommendations may be presented as a series of visual graphical representations highlighting historically top performing consumer segments and overlaps, while also identifying lookalike segments. Targeting segment recommendations may include certain user identifiers, such as segments that may have added a product to a cart but not completed a purchase, or consumers that recently purchased a competitor product, or consumers that never made a purchase from a certain category and/or brand, etc. Such targeting may allow for specific and highly impactful selection of users to which content is to be delivered.

In some embodiments, one or more target consumer recommendations may be generated for the content delivery campaign based at least in part on the campaign goal and/or historical data associated with the user account. For example, if a campaign goal is to drive new customer acquisitions, targeting segment recommendations may include users that have not previously purchased a product associated with the brand, or have not made a purchase of a product associated with the brand within a predetermined time period (e.g., the last 12 months, etc.). Consumers that made purchases of products associated with the brand may be eliminated from the target segment recommendations. In another example, if a campaign goal is to drive mobile application downloads, then mobile device users may be included in as a recommended targeting segment.

In some embodiments, target consumer recommendations may be generated based at least in part on historical data associated with a user account. For example, previous campaign performance and/or historical sales data may be analyzed to determine effective targeting segment recommendations. Historical sales data may represent users that are likely to purchase products associated with the brand. In another example, targeting segments may include streaming audio device users for delivery of audio content impressions.

Historical sales data may be used to generate target segment recommendations. For example, historical sales data may be received (e.g., from a campaign manager and/or other user account, etc.) as anonymized customer information of customers that previously purchased a product of the brand. The customer information may be anonymized in that private details and/or personal identification information associated with individual customers may be obscured or scrubbed from the data. The customer information may be received and formatted as customer relationship management data, and may be hashed and mapped to determine target segment recommendations. The customer information may be segmented into a number of customer segments, such as a first customer segment. A lifestyle characteristic of the first customer segment may be determined. For example, the first customer segment may represent a lifestyle characteristic of "meateater." A second customer segment that has the lifestyle characteristic, in this case "meateater," such as a lifestyle segment of "barbeque aficionados," may be determined. The second customer segment may be a "lookalike" customer segment or may be otherwise similar to the first customer segment. The second customer segment may be a group of users to target, and may be included as a target segment recommendation. One or more user interfaces may be generated that provide a visual depiction of overlap between the first customer segment and the second customer segment. Sizes, colors, and/or other graphical formatting of the visual depiction may be used to convey target segment recommendations to users, and the related overlap between previously targeted segments and recommended segments, so as to allow users to quickly consume the information.

Target segment recommendations may be generated based at least in part on a brand category or a category of product for which the content campaign is being created. For example, if the brand category is a millennial brand category, in that millennials are frequent purchasers of products associated with the brand, then millennials may be a recommended target segment. In one example, computer-executable instructions of one or more recommendation module(s) stored at a remote server may be executed to determine a user category associated with a user account. The user account may be the user account of a campaign manager that is requesting creation of a content delivery campaign. A user category may be a brand category and may be determined based at least in part on product identifiers associated with the user account. A set of one or more other users in the user category or brand category may be determined. For example, competitors and other brands that sell products or are otherwise associated with the identified user category may be determined. Historical sales information associated with one or more of the respective users of the set of one or more users may be determined. Historical sales information may be determined for the user account, for competitors, for other user accounts in the same user category, and the like. The historical sales information may be used to generate at least one of the target consumer recommendations for the content delivery campaign. In some embodiments, at least one or more of the campaign goal, the historical data associated with the user account, or the historical sales information for one or more of the user account and related user accounts (e.g., user accounts in the same user category, etc.) may be used in determining target consumer segment recommendations.

In FIG. 3, target segment recommendations 350 may be presented at the second user interface 330. The recommended target segments may include, for example, "adventurers," "meateaters," "cooks," and "new customers," or customers that have not purchased one of the recommended products or a related product within a certain time period. The recommended target segments may be segments that were not previously targeted by campaigns associated with the brand, or may be segments that were previously targeted.

Similarly, in FIG. 4, target segment recommendations 460 may be presented at the second user interface 440. The recommended target segments may include, for example, "purchasers of competitor products" and customers that "placed a product in cart (e.g., a recommended product or related product, etc.) but did not purchase" or another recommended segment.

At block 210 of the process flow 200, a set of one or more recommended digital product types may be generated. Digital product types may be digital products where content impressions can be delivered. For example, digital product types may include website product types (e.g., content presented at content delivery slots at webpages, etc.), audio product types (e.g., content delivered during streaming music playback, etc.), device specific content slots (e.g., content delivered at specific devices such as smartphones, watches, tablets, etc.), mobile application product types (e.g., in-app content delivery, etc.), and other digital product types. Digital product types may include device specific products, such as smartphone products, tablet products, laptop products, television products, and the like. Digital product types may include device ad products and placements, auction-based digital products, guaranteed-placement digital products, native digital products, retargeting and performance digital products (e.g., sponsored products and headline search ads, etc.), as well as native content and scalable third party digital products. Because different digital product types may have different user reach or different user interaction rates (which may be particular to the user account or brand), selecting optimal digital product types may improve campaign performance. In addition, selecting optimal digital product types in view of a global budget for a content delivery campaign may maximize value derived from the content delivery campaign, as user interaction with content impressions may be optimized or improved. In one example, computer-executable instructions of one or more recommendation module(s) stored at a remote server may be executed to generate a set of one or more digital product type recommendations. Digital product type recommendations may be based at least in part on the campaign goal (e.g., if the campaign goal is to increase mobile app downloads, mobile device digital product types may be recommended, etc.), and/or a global budget value for the content delivery campaign (e.g., if the global budget value is relatively low, cheaper digital product types may be recommended, etc.). Digital product type recommendations may be cross-channel and/or cross-platform. Digital product type recommendations may be presented as a showcase or other visual format.

Digital product type recommendations may be based at least in part on a supply and/or available or forecasted inventory of respective digital product types. For example, if a certain digital product type, such as a mobile device banner digital product type, has low available inventory, or is forecasted to have low available inventory over the flight time of the content delivery campaign, the digital product type may not be recommended, or may be recommended with a relatively higher budget allocation, to assist in presenting more impressions at a relatively higher cost. In one example, an available supply of digital product types during the campaign flight time may be determined. Available supply and/or forecasted supply may be determined based at least in part on an evaluation of other content delivery campaigns that may have flight times overlapping with the flight time of the campaign for which the recommendation is being generated. The digital product type recommendation may be determined or generated based at least in part on the global budget value, the flight time, and/or the available or forecasted supply. For example, the greater the global budget value, the increased likelihood that scarcity of supply of any particular digital product type may be offset. This may be because the chance of presenting impressions at the respective digital product type may be increased due to the higher budget (and resulting higher bid values where an auction process is used to determine which content impression to present in a given content slot).

In FIG. 3, digital product type recommendations 360 may be presented at the second user interface 330. The recommended digital product types may include a media mix with digital product types of, for example, in-app content, audio content, and checkout page placement for content. In FIG. 4, digital product type recommendations 470 may include in-app content, email content, and audio content. Email content may be content configured for emailing to targeted users.

At block 212 of the process flow 200, a recommended budget allocation values may be generated. Budget allocation values may be recommended for one or more of the digital product types that are recommended. Budget allocation value recommendations may be determined based at least in part on the global budget value, or may be determined based at least in part on the available or forecasted supply of respective digital product types, or may be determined based at least in part on historical performance data associated with respective digital product types. For example, if a certain digital product type has performed very well in the past for the brand, a relatively high budget allocation value may be generated for that digital product type. Budget allocation values may be determined independent of the global budget value. For example, budget allocation values may be presented as percentages instead of absolute values. In some embodiments, block 212 may be optional.

In one example, computer-executable instructions of one or more recommendation module(s) stored at a remote server may be executed to generate a budget allocation recommendation for one or more, or each, of the recommended digital product types. Budget allocation recommendations may be determined based at least in part on the global budget value and/or the available supply. One or more machine learning algorithms may be used to determine recommendations for the content delivery campaign, and may be trained using product information, related product information, competing product information, historical campaign results for respective products, and the like.

Budget allocation values, which may be represented as portions or percentages of the global budget, may be based at least in part on the user's or user account's category historical performance, a brand health metric, and/or historical omni-channel campaign performance across one or more platforms.

For example, in FIG. 4, the recommended digital product types 470 may include respective budget allocation recommendations. In-app content may be associated with a budget allocation recommendation of 20% of the global budget, email content may be associated with a budget allocation recommendation of 35% of the global budget, and audio content may be associated with a budget allocation recommendation of 45% of the global budget.

At block 214 of the process flow 200, a set of one or more creative materials with dynamic functionality may be generated. The creative materials may be automatically generated based at least in part on the campaign goal, or may be automatically generated based at least in part on one or more user inputs. The creative materials may include product and/or brand identifiers, such as images, logos, names, ratings, prices, and other information. Creative materials may be generated in different formats, for example, in each format needed for the recommended digital product types. Creative materials may be in any suitable digital format, such as a visual format or an audio format. For audio format, creative materials may include automatically generated audio segments that may include promotional offers, music, jingles, sounds, and other audio data.

The creative materials may have dynamic functionality that may be predetermined or determined in or near real-time, for example, based at least in part on contextual information for a given content delivery slot. Dynamic functionality may include functionality such as discounts, promotional offers such as free shipping, subscribe and save options, and other functionality. One or more aspects of the dynamic functionality may be determined based at least in part on contextual information. For example, an amount of a discount may be determined specific for certain users or geographic areas. In another example, audio content may be presented only to users that have previously purchased a product, so as to increase a likelihood that the user to whom the audio content is presented is familiar with the product that is associated with the promotional offer.

Creative material that is automatically generated may be presented in a showcase format, such as in a library view. Creative material may be generated and formatted for presentation in various sizes and for various platforms. Products that are featured in the creative materials may be products that were recommended for inclusion in the campaign, or may be products that were selected or input by a user. In some embodiments, an option to upload creative materials, such as background images, may be provided to users.

In one example, computer-executable instructions of one or more creative generation module(s) stored at a remote server may be executed to generate one or more creative recommendations, which may be creative materials, for digital impressions of the content delivery campaign. An option to select one or more of the creative materials for including in the content delivery campaign may be provided to the user.

The creative materials may be generated based at least in part on historical sales data. For example, if there is a product that is more popular than other products, based on historical sales data, web traffic, user interaction, previous campaigns, or by any other suitable metric, that product may be featured in creative materials.

Creative materials may be generated based at least in part on predicted sales increases or another predicted metric for the product. For example, a predicted sales increase for a product over the course of the campaign (which may be a result of the campaign itself or another factor, such as seasonality, etc.), may be determined. Predicted sales increases may be determined based at least in part on historical sales information for the product, a ranking of the product on a "bestselling" list, or another factor. Predicted sales increases may be determined for one or more products that may be included or featured in the campaign. In an example, if two products are to be included in a campaign, predicted sales increases may be determined for each respective product and compared to determine which predicted sales increase is greater, or which absolute sales value is higher, and the respective product with the higher increase or absolute value may be featured in the creative materials, because that product may be more popular or more likely to result in user interaction with an impression than the other product.

Creative materials generated by the system may include audio segments. Audio segments may be presented as part of visual impressions (e.g., hovering over or clicking on a visual impression may result in the audio segment being played, etc.), or may be presented independent of visual impressions, such as at a streaming audio device. A first audio segment may be generated for a product based at least in part on the campaign goal. For example, if the campaign goal is to increase brand awareness, the audio segment may be related to a brand or product fact, such as Brand Y is the fastest growing company in America, or Product X is the number one bestseller on a particular website. In another example, if the campaign goal is to increase sales, the audio segment may be related to a promotional offer or other discount. In another example, if the campaign goal is to increase engagement, the audio segment may be a recipe that uses a product associated with the brand. Other campaign goals may be associated with different audio segments. Audio segments may be generated by converting text to speech in some embodiments, or converting text content from a text format to an audio format. Audio segments may include audible offers, such as offers to make a purchase, initiate an order, request additional information, signup for a membership or listserv, download an application, or other offers. Audio segments may include one or more of a jingle, a recipe, a song, or other audio.

In some embodiments, specific landing pages may be generated for campaigns. The landing pages may not drive to product detail pages or search results pages, and instead may align with the content of the creative messaging.

In FIG. 3, auto-generated creative materials 370 may be presented in a scrollable or navigable format, where audio segments may be available for listening, and creative materials in different formats and with different styles, strategies, and the like may be presented for review by a user. Example types of content may include, but are not limited to, class 1 displays, network media, device-specific special offers, and the like. In FIG. 4, a creative library showcase 480 may be presented to the user or may be available via a link that is presented at the second user interface 440. The creative materials may be reviewed and/or approved, and in some instances modified, by the user.

At optional block 216 of the process flow 200, a content delivery campaign package with one or more of the campaign recommendations may be presented. For example, the content delivery campaign package may include the recommended product identifiers, the recommended targeting segments, the recommended digital product types, the recommended budget allocation values, and/or the recommended creative materials, and may be presented at a user device. In one example, computer-executable instructions of one or more module(s) stored at a remote server may be executed to generate the content delivery campaign package and send the package information to a user device, at which it can be presented. The user can then review the package and execute or implement the package with a single-action, such as one-click. In another example, computer-executable instructions of one or more module(s) stored at a remote server may be executed to cause presentation of a content delivery campaign package at a user device after receiving the selection of the campaign goal. The content delivery campaign package may be presented immediately after receiving selection of the campaign goal, such that the user does not have to input any further information before the package is presented. In some embodiments, the user may be able to modify the package before executing, while in other embodiments, the user may not be able to modify the package. After receiving the indication of the selection of the campaign goal and after receiving the first product identifier, in some instances, presentation of a content delivery campaign package at a user device may be caused, where the package may include the product recommendation, the target segment recommendation, the digital product type recommendation, the budget allocation recommendation, and/or the creative recommendation.

Because of the simplified input and output process, the user may see each portion of the campaign that would otherwise have to be manually entered, as well as an actionable output that is a brand-optimized omni-channel media plan in a format that is presentable to an advertiser for pitch or final approval. The user may select "initiate campaign" or perform a single-action resulting in the campaign being finalized and/or initiated. Content impressions associated with the campaign may then be delivered or served in accordance with the flight time of the campaign.

In FIG. 3, the content delivery campaign package is presented at the second user interface 330, while in FIG. 4, the content delivery campaign package is presented at the second user interface 440. The content delivery campaign package may be presented with a single-click option to execute for initiation of the campaign. For example, the second user interface 330 in FIG. 3 may include a single click option 380 to initiate the campaign, while the second user interface 440 in FIG. 4 may include a start campaign option 490 that results in initiation of the content delivery campaign package when selected.

At block 218 of the process flow 200, an indication of a single-action performed by a user may be received. For example, a user may perform a single-action, such as a single click, tap, gesture, audible sound, or other action at a user device. The single-action may be a voice-based action, a gesture-based action, a tactile-based action, or another action. In one embodiment, computer-executable instructions of one or more module(s) stored at a remote server may be executed to determine that a user performed a single-action in response to the presentation of the campaign package. A determination may be made as to whether the single-action corresponds to a predetermined single-action. For example, if a password or audible passcode is associated with the account, the single-action performed by the user may be authenticated accordingly.

In some embodiments, content delivery campaign packages may be initiated or executed with a single-action by the user. For example, in FIG. 3, a one-click selectable option 380 may be presented to the user. The user may simply click or tap on the option 380 to initiate the content delivery campaign. A remote server may receive an indication of the selection and may determine that the user performed a single-action in response to the presentation of the content delivery campaign package. The indication of the single-action or the selection may indicate approval to initiate the content delivery campaign package. In some embodiments, the content delivery campaign package cannot be modified by the user prior to initiation of the content delivery campaign, while in other embodiments, the package can be modified by the user before or after initiation of the campaign. The second user interface 330 may be presented immediately subsequent to, or soon after, the first user interface 300. The second user interface 330 may be presented after the user makes a selection of a campaign goal and before the user makes any subsequent inputs, so as to reduce user interaction, reduce bandwidth consumption, and improve computer efficiency. Embodiments of the disclosure may reduce a number of user interactions needed to place an order and reduce an amount of information that is transmitted between a client system and a server system, resulting in reduced bandwidth usage and improved computing efficiency. In one embodiment, a server system assigns a unique client identifier to each client system and/or user account associated with a brand. The server system also stores purchaser-specific order information for various potential purchasers. The purchaser-specific order information may have been collected from a previous content delivery campaign initiated by the purchaser. The server system maps each client identifier to a purchaser that may use that client system to initiate a content delivery campaign.

At block 220 of the process flow 200, the content delivery campaign may be initiated in response to the single-action. The content delivery campaign may be initiated with delivery settings that correspond to one or more of the recommendations. For example, computer-executable instructions of one or more content delivery module(s) stored at a remote server may be executed to initiate the content delivery campaign in response to the single-action. The content delivery campaign may then be initiated by serving digital content impressions associated with the campaign. In instances where the campaign includes audio content impressions, delivery of audio content impressions may begin after the campaign is initiated.

Figure 5:
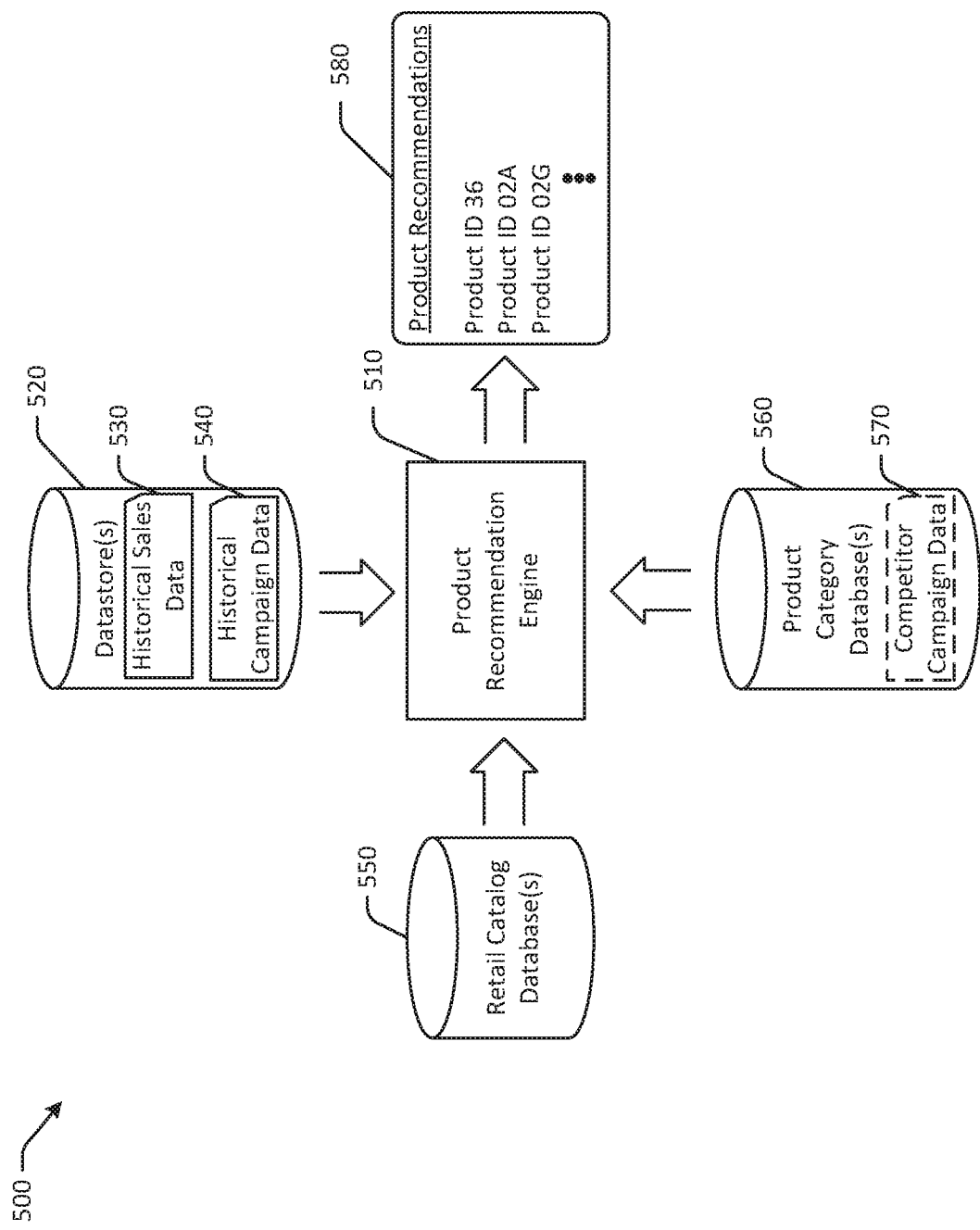
FIG. 5 is an example hybrid system and process flow diagram for determining product recommendations in accordance with one or more embodiments of the disclosure.

FIG. 5 depicts an example hybrid system and process flow diagram 500 for determining product recommendations in accordance with one or more embodiments of the disclosure. In FIG. 5, a product recommendation engine 510 may include computer-executable instructions to determine product recommendations. The product recommendation engine 510 may be stored at a user device or at one or more remote servers. The product recommendation engine 510 may be configured to generate product recommendations for inclusion in a campaign and/or promotion. One or more inputs may be received by or sent to the product recommendation engine 510. For example, in FIG. 5, the product recommendation engine 510 may be in communication with a datastore(s) 520. The datastore(s) 520 may include historical sales data 530 and historical campaign data 540. The product recommendation engine 510 may identify historical sales data for a particular brand or user account, a particular product, a competitor brand or account, or other relevant historical sales data that may be used to determine product recommendations. The product recommendation engine 510 may identify relevant historical campaign data, which may be used to determine previously targeted segments, previously promoted products, user interaction rates, previous campaign performance, and other information that may be used to determine product recommendations.

The product recommendation engine 510 may be in communication with a retail catalog database(s) 550. The retail catalog database(s) 550 may include product information such as brand identifiers for available products, model numbers, pricing information, rating information, product family identifiers, inventory level information, and other product related information. The product recommendation engine 510 may access the retail catalog database(s) 550 to determine products that are related to a selected product or a product that may be recommended for inclusion in a campaign. For example, the product recommendation engine 510 may determine parent, child, or sibling products by analyzing a browse node or other hierarchy of products.

The product recommendation engine 510 may be in communication with a product category database(s) 560. The product category database(s) 560 may include competitor campaign data 570. The competitor campaign data 570 may include data that is associated with campaigns run by other users that sell products in the same product category as a recommended or selected product. The product recommendation engine 510 may access the product category database(s) 560 to determine competitor products and related campaign data for competitor products.

Using some or all of the information determined and/or received from the datastore(s) 520, the retail catalog database(s) 550, and/or the product category database(s) 560, the product recommendation engine 510 may generate a set of one or more product recommendations 580. The product recommendation engine 510 may implement one or more machine learning algorithms to generate product recommendations. The recommended products may be products that will result in optimized campaign performance if featured in or included in the campaign. For example, popular products, products that can benefit from increased exposure, products that are overstocked, products that are similar to successful competitor products, and other products may be recommended for inclusion in the content delivery campaign.

Figure 6:
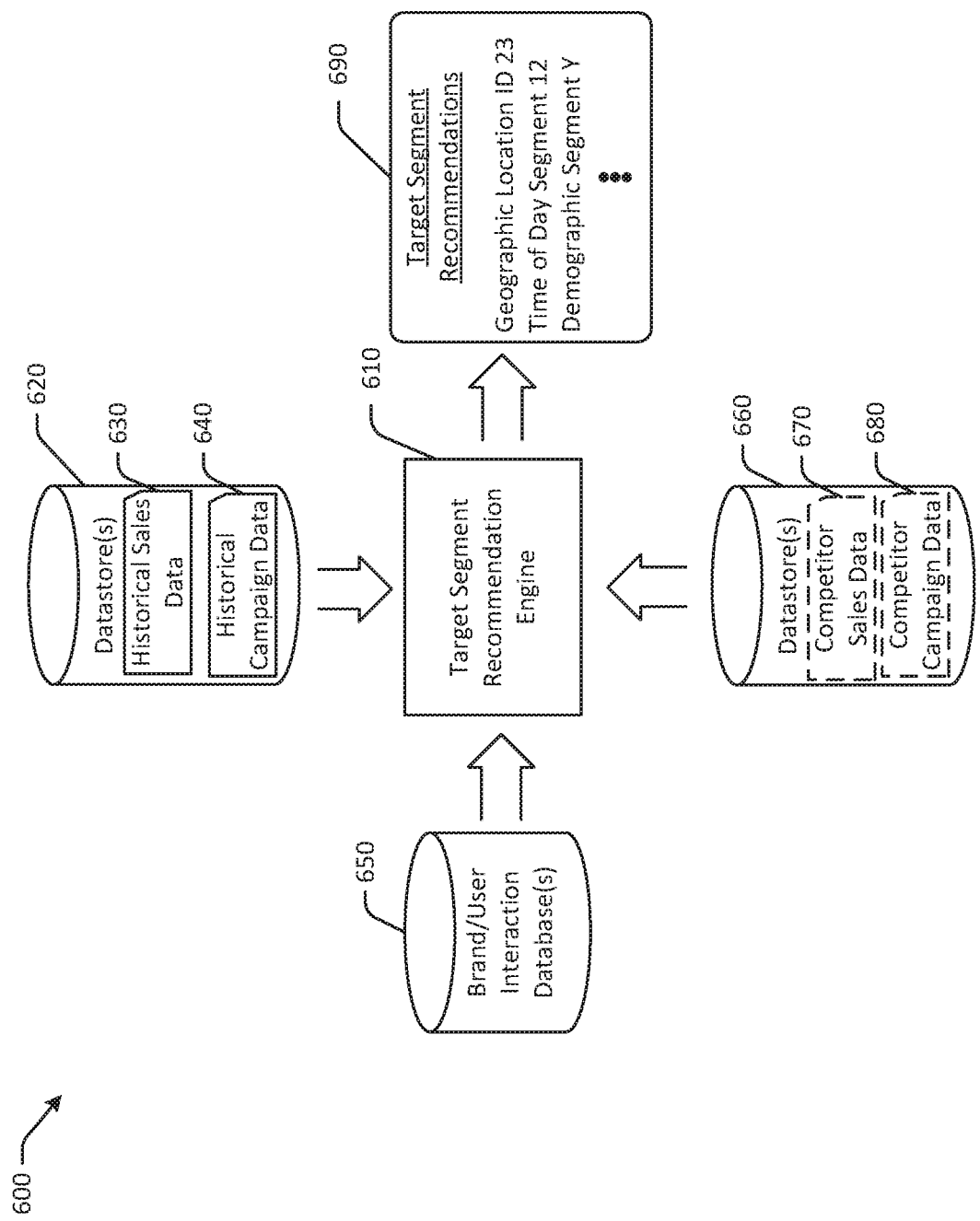
FIG. 6 is an example hybrid system and process flow diagram for determining target segment recommendations in accordance with one or more embodiments of the disclosure.

FIG. 6 depicts an example hybrid system and process flow diagram 600 for determining target segment recommendations in accordance with one or more embodiments of the disclosure. In FIG. 6, a target segment recommendation engine 610 may include computer-executable instructions to determine target segment recommendations. The target segment recommendation engine 610 may be stored at a user device or at one or more remote servers. The target segment recommendation engine 610 may be configured to generate target segment recommendations for content delivery campaigns. Content impressions associated with the content delivery campaign may be targeted towards users, groups of users, devices, platforms, or other targets that are generated by the target segment recommendation engine 610. One or more inputs may be received by or sent to the target segment recommendation engine 610, such as user selected target segments. In FIG. 6, the target segment recommendation engine 610 may be in communication with a datastore(s) 620. The datastore(s) 620 may include historical sales data 630 and historical campaign data 640. The target segment recommendation engine 610 may identify historical sales data for a particular brand or user account, a particular product, a competitor brand or account, or other relevant historical sales data that may be used to determine target segment recommendations. The target segment recommendation engine 610 may identify relevant historical campaign data, which may be used to determine previously targeted segments, previous targeting criteria, previously promoted products, user interaction rates, previous campaign performance, and other information that may be used to determine target segment recommendations.

The target segment recommendation engine 610 may be in communication with a brand/user interaction database(s) 650. The brand/user interaction database(s) 650 may include browsing data related to users that have browsed or interacted with products associated with the brand (e.g., clicked on, added to cart, considered purchasing, signed up for more information, etc.), users that have purchased products associated with the brand, users that have reviewed products associated with the brand, and other data related to interactions between users and a brand. The target segment recommendation engine 610 may access the brand/user interaction database(s) 650 to determine user segments or particular users or groups of users that should be recommended for targeting in a campaign. For example, the target segment recommendation engine 610 may determine target segments based at least in part on historical user interactions with a brand.

The target segment recommendation engine 610 may be in communication with a datastore(s) 660. The datastore(s) 660 may include competitor sales data 670 and competitor campaign data 680. The competitor sales data 670 may be associated with users that have made purchases of competitor products or have interacted with competitor products. The competitor campaign data 670 may include data that is associated with campaigns run by other users that sell products in the same product category as a recommended or selected product. The target segment recommendation engine 610 may access the datastore(s) 660 to determine competitor products and related campaign data for competitor products.

Using some or all of the information determined and/or received from the datastore(s) 620, the brand/user interaction database(s) 650, and/or the datastore(s) 660, the target segment recommendation engine 610 may generate a set of one or more target segment recommendations 690. The target segment recommendation engine 610 may implement one or more machine learning algorithms to generate target segment recommendations. The recommended target segments may be segments that will result in optimized campaign performance. For example, segments that will likely respond to impressions may be targeted as opposed to segments that may not respond or interact with impressions. Target segment recommendations may include geographic, demographic, chronological, and other segment recommendations.

Figure 7:
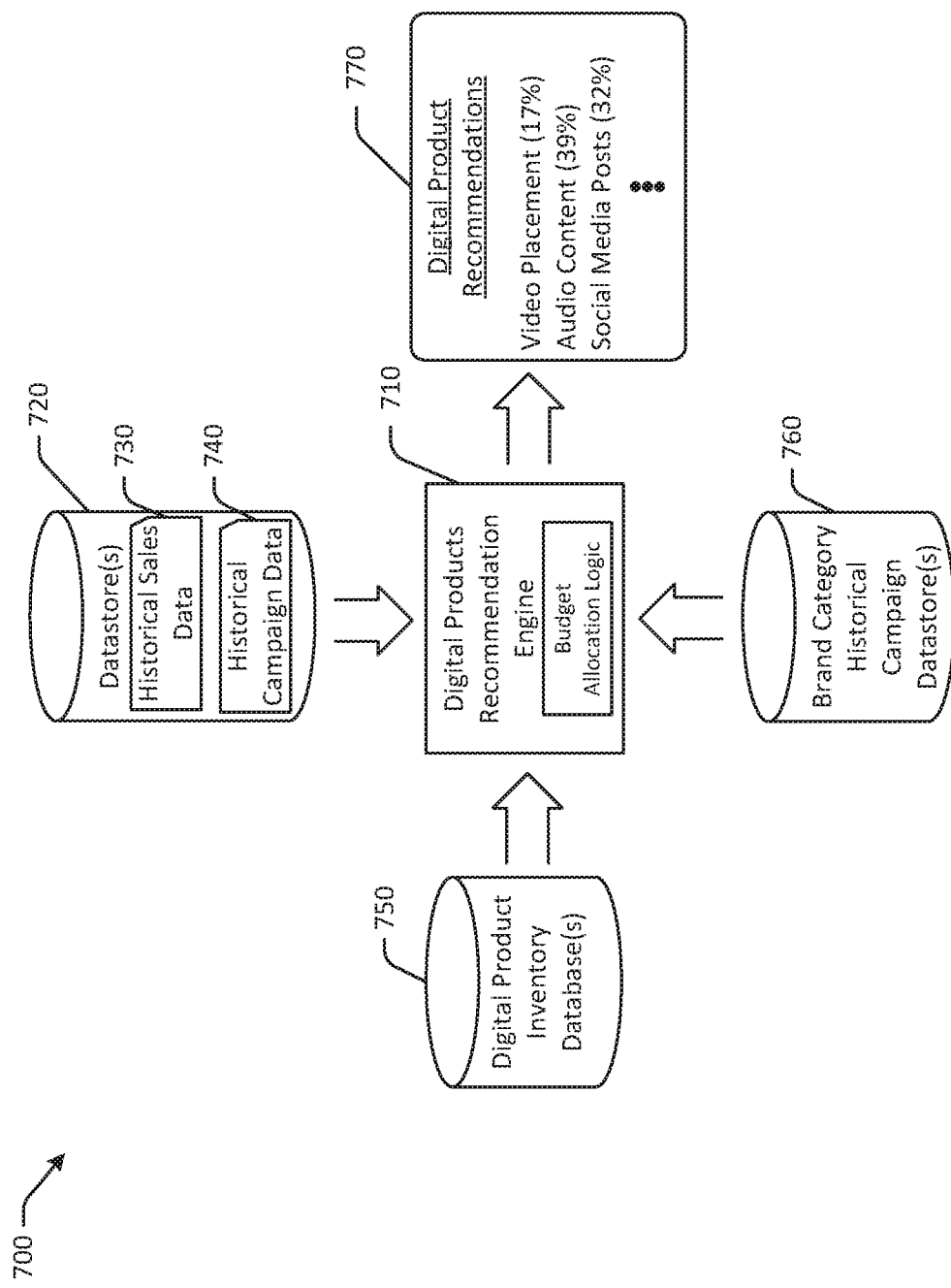
FIG. 7 is an example hybrid system and process flow diagram for determining digital products recommendations in accordance with one or more embodiments of the disclosure.

FIG. 7 depicts an example hybrid system and process flow diagram 700 for determining digital products recommendations in accordance with one or more embodiments of the disclosure. In FIG. 7, a digital products recommendation engine 710 may include computer-executable instructions to determine digital products recommendations. In some embodiments, the digital products recommendation engine 710 may include or otherwise execute budget allocation logic to determine budget allocation values for one or more recommended digital products. The digital products recommendation engine 710 may be stored at a user device or at one or more remote servers. The digital products recommendation engine 710 may be configured to generate digital products recommendations for content delivery campaigns. Content impressions associated with the content delivery campaign may be delivered or served at platforms or digital product slots that are generated by the digital products recommendation engine 710. One or more inputs may be received by or sent to the digital products recommendation engine 710, such as user selected digital products. In FIG. 7, the digital products recommendation engine 710 may be in communication with a datastore(s) 720. The datastore(s) 720 may include historical sales data 730 and historical campaign data 740. The digital products recommendation engine 710 may identify historical sales data for a particular brand or user account, a particular product, a competitor brand or account, or other relevant historical sales data that may be used to determine digital products recommendations. The digital products recommendation engine 710 may identify relevant historical campaign data, which may be used to determine previously used digital products or product types, previously targeted segments, previous targeting criteria, previously promoted products, user interaction rates, previous campaign performance, and other information that may be used to determine digital products recommendations.

The digital products recommendation engine 710 may be in communication with a digital product inventory database(s) 750. The digital product inventory database(s) 750 may include available inventory for one or more digital product types across a number of channels and/or platforms. In some embodiments, the digital product inventory database(s) 750 may include forecasted inventory, while in other embodiments, the digital products recommendation engine 710 may generate forecasted inventory values. The digital products recommendation engine 710 may access the digital product inventory database(s) 750 to determine digital product types that should be recommended for targeting in a campaign. For example, the digital products recommendation engine 710 may determine digital products based at least in part on historical campaign performance of various digital product types.

The digital products recommendation engine 710 may be in communication with a brand category historical campaign datastore(s) 760. The brand category historical campaign datastore(s) 760 may include historical campaign data for all brands within a certain brand category, such as a millennial focused brand, a children's brand, or another brand category. The brand category historical campaign datastore(s) 760 may include competitor sales data and competitor campaign data. The competitor sales data may be associated with users that have made purchases of competitor products or have interacted with competitor products. The competitor campaign data may include data that is associated with campaigns run by other users that sell products in the same product category as a recommended or selected product. The digital products recommendation engine 710 may access the brand category historical campaign datastore(s) 760 to determine competitor products and related campaign data for competitor products.

Using some or all of the information determined and/or received from the datastore(s) 720, the digital product inventory database(s) 750, and/or the brand category historical campaign datastore(s) 760, the digital products recommendation engine 710 may generate a set of one or more digital products recommendations 770. The digital products recommendation engine 710 may implement one or more machine learning algorithms to generate digital products recommendations. The recommended digital products may be various types of digital products that may result in optimized campaign performance. For example, digital products that will likely result in user interaction may be recommended. Digital products recommendations may include channel and platform recommendations. Certain embodiments may include budget allocation recommendations and/or volume recommendations, such as a number of recommended impressions, for one or more recommended digital product types, and may be determined based at least in part on an expected conversion rate for one or more of the digital product types. For example, a video placement recommendation may be associated with a budget allocation of 17%, while audio content may be recommended an allocation of 39% and social media posts allocated 32% of a global budget for the campaign.

Figure 8:
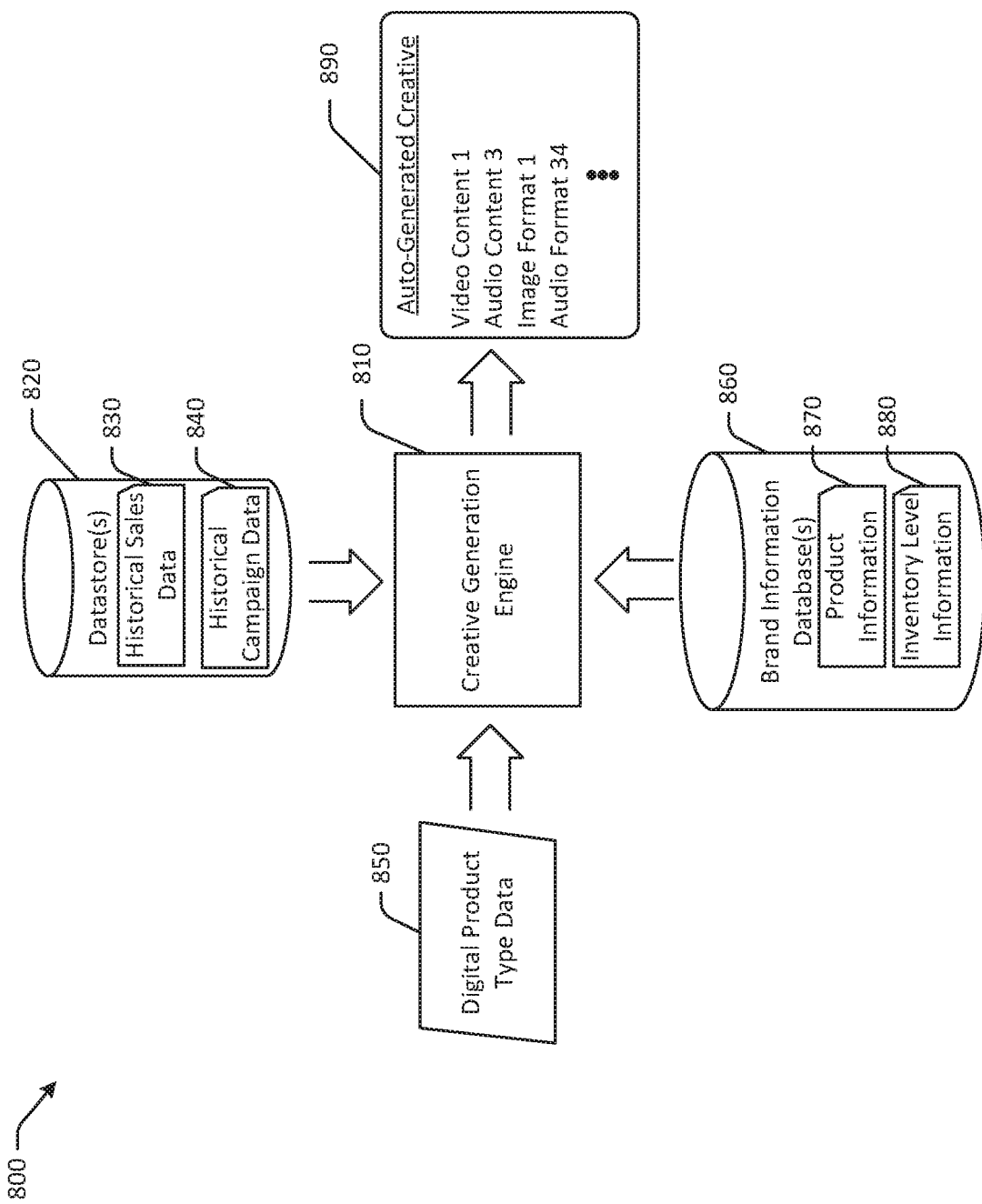
FIG. 8 is an example hybrid system and process flow diagram for generating creatives in accordance with one or more embodiments of the disclosure.

FIG. 8 depicts an example hybrid system and process flow diagram 800 for generating creatives in accordance with one or more embodiments of the disclosure. In FIG. 8, a creative generation engine 810 may include computer-executable instructions to generate creative materials and/or recommendations of creative materials. The creative generation engine 810 may be stored at a user device or at one or more remote servers. The creative generation engine 810 may be configured to generate creative materials for content delivery campaigns. Content impressions associated with the content delivery campaign may include creative materials generated by the creative generation engine 810. One or more inputs may be received by or sent to the creative generation engine 810, such as user selected creative materials. In FIG. 8, the creative generation engine 810 may be in communication with a datastore(s) 820. The datastore(s) 820 may include historical sales data 830 and historical campaign data 840. The creative generation engine 810 may identify historical sales data for a particular brand or user account, a particular product, a competitor brand or account, or other relevant historical sales data that may be used to generate creative materials and/or recommendations. The creative generation engine 810 may identify relevant historical campaign data, which may be used to determine previously used creative materials associated with products, previously targeted segments, previous targeting criteria, previously promoted products, user interaction rates, previous campaign performance, and other information that may be used to generate creative materials and/or recommendations.

The creative generation engine 810 may receive or determine digital product type data 850. The digital product type data 850 may include creative materials associated with different digital product types, as well as performance metrics with the respective digital product types. Based at least in part on the digital product type data 850, the creative generation engine 810 may determine images, products, text, and other information that corresponds to high performing creative materials. The creative generation engine 810 may access the digital product type data 850 to generate creative materials for a campaign. For example, the creative generation engine 810 may generate creative materials that combine portions of previously used creative materials based at least in part on historical campaign performance of various digital product types.

The creative generation engine 810 may be in communication with a brand information database(s) 860. The brand information database(s) 860 may include product information 870 and inventory level information 880. The product information may include information for one or more, or all, products that are associated with a particular brand. The inventory level information 880 may include inventory level information associated with the products included in the product information 870. The brand information database(s) 860 may include additional information related to a brand, such as a brand category, advertising strategy, outreach strategy, brand messaging, brand images, and other brand information. The creative generation engine 810 may access the brand information database(s) 860 to determine images, messaging, text, logos, or other features for creative materials.

Using some or all of the information determined and/or received from the datastore(s) 820, the digital product type data 850, and/or the brand information database(s) 860, the creative generation engine 810 may generate a set of one or more creative materials and/or recommendations 890. The creative generation engine 810 may implement one or more machine learning algorithms to generate creative materials. The creative materials may be various types and formats that may result in optimized campaign performance. For example, creative materials that will likely result in user interaction may be generated.

Figure 9:
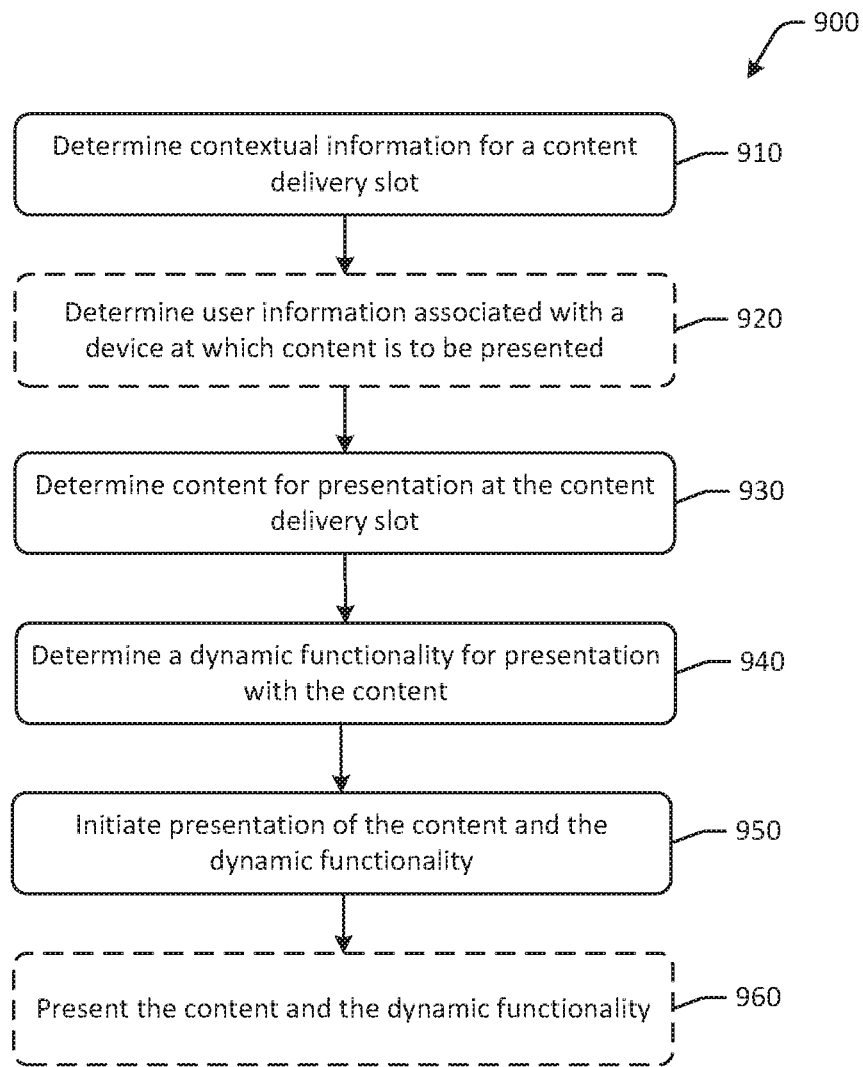
FIG. 9 is an example process flow diagram for generating content with dynamic functionality in accordance with one or more embodiments of the disclosure.

FIG. 9 depicts an example process flow 900 for generating content with dynamic functionality in accordance with one or more embodiments of the disclosure. At block 910 of the process flow 900, contextual information for a content delivery slot may be determined. For example, computer-executable instructions of one or more content delivery module(s) stored at a content delivery server may be executed to determine contextual information for a content delivery slot. Contextual information may be received during a bidding or auction process and may indicate information such as a device at which a content delivery slot is available, contextual information surrounding the available slot (e.g., financial news, sports information, etc.), user information associated with a device or browsing session (e.g., user account associated with a streaming media or audio device, etc.), time of day, and other contextual information. Contextual information may be received as part of a bid request.

At optional block 920, user information associated with a device at which content is to be presented is determined. User information may include user preferences, user demographics, browsing and/or purchase history, and other user information. User information may be included as contextual information, or may be determined based at least in part on a user identifier. For example, computer-executable instructions of one or more content delivery module(s) stored at a content delivery server may be executed to determine user information associated with a device at which a content impression is to be presented. The device may be a streaming audio device or another device, and may or may not be coupled to a display.

At block 930, content for presentation at the content delivery slot is determined. For example, computer-executable instructions of one or more content delivery module(s) stored at a content delivery server may be executed to identify one or more creative materials and/or content that is to be served or presented at the available content delivery slot.

At block 940, a dynamic functionality for presentation with the content is determined. For example, computer-executable instructions of one or more content delivery module(s) stored at a content delivery server may be executed to determine or select a dynamic functionality. Selections or determinations of dynamic functionality may be based at least in part on the user information. Dynamic functionality may be determined after receiving the context information and before determining content that is to be presented. Dynamic functionality may be one or more of a subscribe and save offer, a discount, a promotional offer, a special deal, a game, or other functionality that may be presented in addition to, or in conjunction with, a content impression.

At block 950, presentation of the content and the dynamic functionality is initiated. For example, computer-executable instructions of one or more content delivery module(s) stored at a content delivery server may be executed to send a content impression identifier and/or a dynamic functionality identifier to a publishing server for delivery and/or serving at a user device.

At optional block 960, the content and the dynamic functionality may be presented. For example, a user device may receive the content impression identifier and/or the creative material and dynamic functionality and present the content impression and functionality to a user. The content impression may include a product identifier, such as a name or image.

Figure 10:
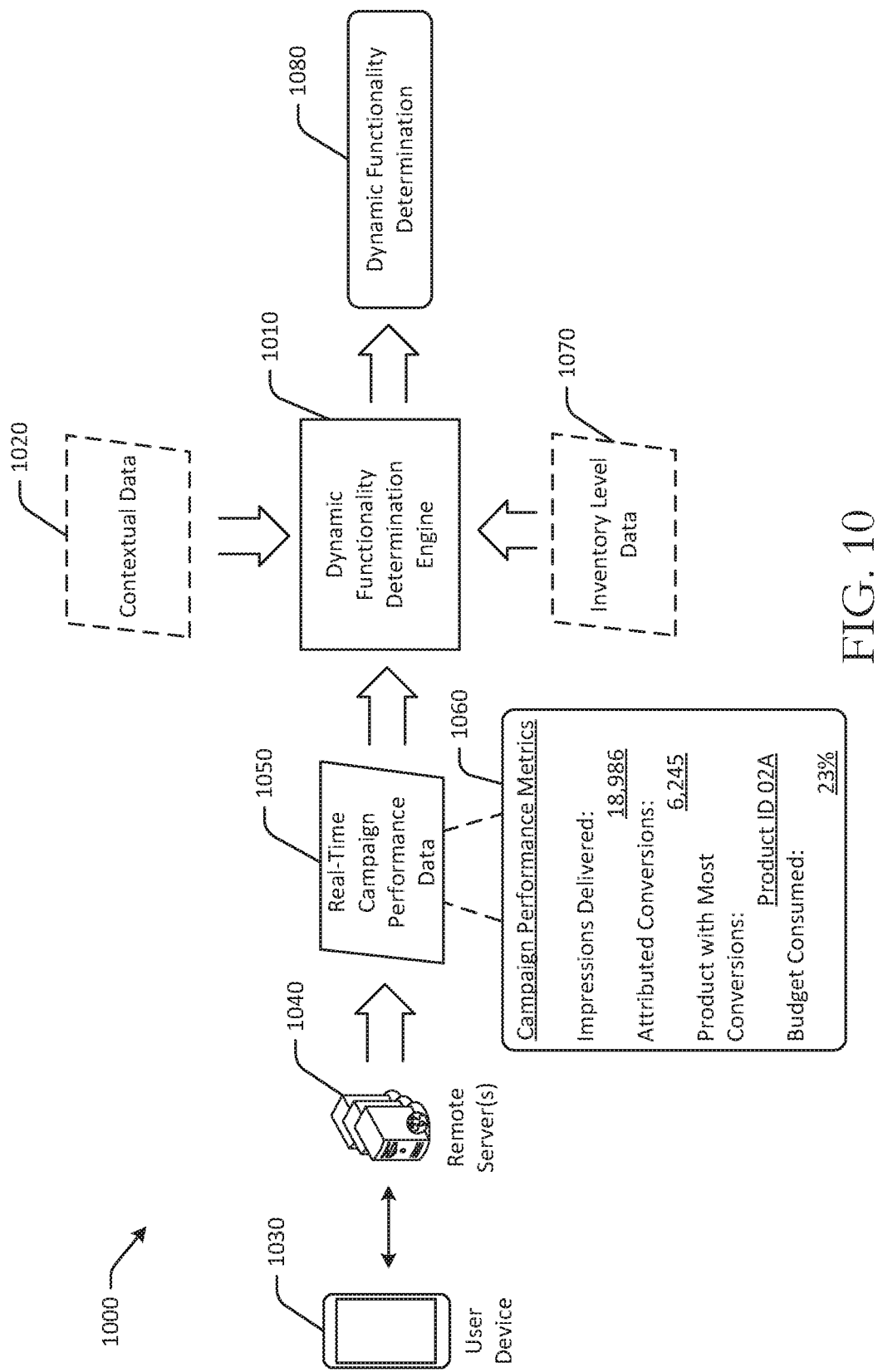
FIG. 10 is an example hybrid system and process flow diagram for determining dynamic functionality for digital content in accordance with one or more embodiments of the disclosure.

FIG. 10 depicts an example hybrid system and process flow diagram 1000 for determining dynamic functionality for digital content in accordance with one or more embodiments of the disclosure. Content delivery campaign settings may be automatically tracked and/or dynamically optimized over the flight time of a campaign without manual input. For example, user interaction, sales data, user engagement, and other metrics may be tracked with respect to delivered content impressions.

A dynamic functionality determination engine 1010 may include computer-executable instructions to determine dynamic functionality that is to be presented with any given content impression. Dynamic functionality may be a specific promotional offer, a discount for a particular user, or other functionality that may be different than other impressions delivered to another user or at another device.

The dynamic functionality determination engine 1010 may optionally receive or determine contextual data 1020. The contextual data 1020 may include data related to specific users and/or information related to context of an available content delivery slot.

The dynamic functionality determination engine 1010 may receive real-time campaign performance data 1050, which may be at or near real-time. The campaign performance data 1050 may indicate effectiveness or performance of various portions of the content delivery campaign. For example, a remote server 1040 may be in communication with a user device 1030 at which a content impression was served. The remote server 1040 may send campaign performance data to another server that may aggregate performance data across a number of servers periodically or continuously. In one example, campaign performance metrics 1060 may include metrics such as a number of impressions delivered, a budget amount consumed, a number of attributed conversions or conversions attributed to the campaign, a ranking of products with the most conversions, and/or other performance metrics. The campaign performance data 1050 may be sent to and/or determined by the dynamic functionality determination engine 1010.

Campaign performance metrics 1060 may be processed and/or determined by the dynamic functionality determination engine 1010. For example, a first functionality may have been presented with a first digital impression of the content delivery campaign, and a second functionality may have been presented with a second digital impression of the content delivery campaign. Respective conversion rates for the first functionality and the second functionality may be determined. Conversion rates may be rates at which the functionality is associated with user interaction or desired conversion activity (e.g., purchase instead of just clicking through, etc.). The respective conversion rates may be compared, and the functionality associated with the relatively higher conversion rate may be presented more frequently in future content impressions. Budget amounts may also be reallocated based at least in part on performance metrics, such as conversion rates.

The dynamic functionality determination engine 1010 may optionally receive or determine inventory level data 1070. The inventory level data 1070 may reflect current and/or projected inventory levels for products associated with the campaign. The inventory level data 1070 may account for reordered inventory.

The dynamic functionality determination engine 1010 may determine or select a dynamic functionality 1080 based at least in part on the contextual data 1020, the campaign performance data 1050, and/or the inventory level data 1070. For example, contextual data may indicate that the user to which an impression may be presented is interested in subscription deals. As a result, the dynamic functionality determination engine 1010 may determine that a subscribe and save functionality should be presented rather than a promotional offer for free shipping. In another example, campaign performance data may indicate that promotional offers associated with a particular product are leading to the most conversions, and as a result, the dynamic functionality determination engine 1010 may determine that a promotional offer for the product should be presented, rather than a promotional offer or other functionality for another product. In another example, inventory level data 1070 may indicate that a quickly selling item is out of stock, and as a result, another product should be featured or offered in a promotion so as to avoid leading users to the out of stock product.

The determined dynamic functionality may be presented or served in addition to or with the content impression. For example, digital content impressions may include a dynamic functionality indicator, such as a button, link, or other indicator that can be interacted with by a user. User interaction with the content impression and/or the dynamic functionality indicator may result in an action taking place, such as redirecting a web browser, initiating an order, or another action. In one example, a user interaction with a digital impression may be detected or determined, and may cause redirection of a device browser to a landing page. The landing page may include first content that is determined based at least in part on the functionality. For example, if the functionality was ordering a product, the landing page may include an order form, whereas if the functionality was registering for a listserv, the landing page may include an email address field. In some embodiments, landing pages may include promotional offers, where the specific promotional offer varies between functionality and/or content impressions leading to the redirection to the landing page.

Figure 11:
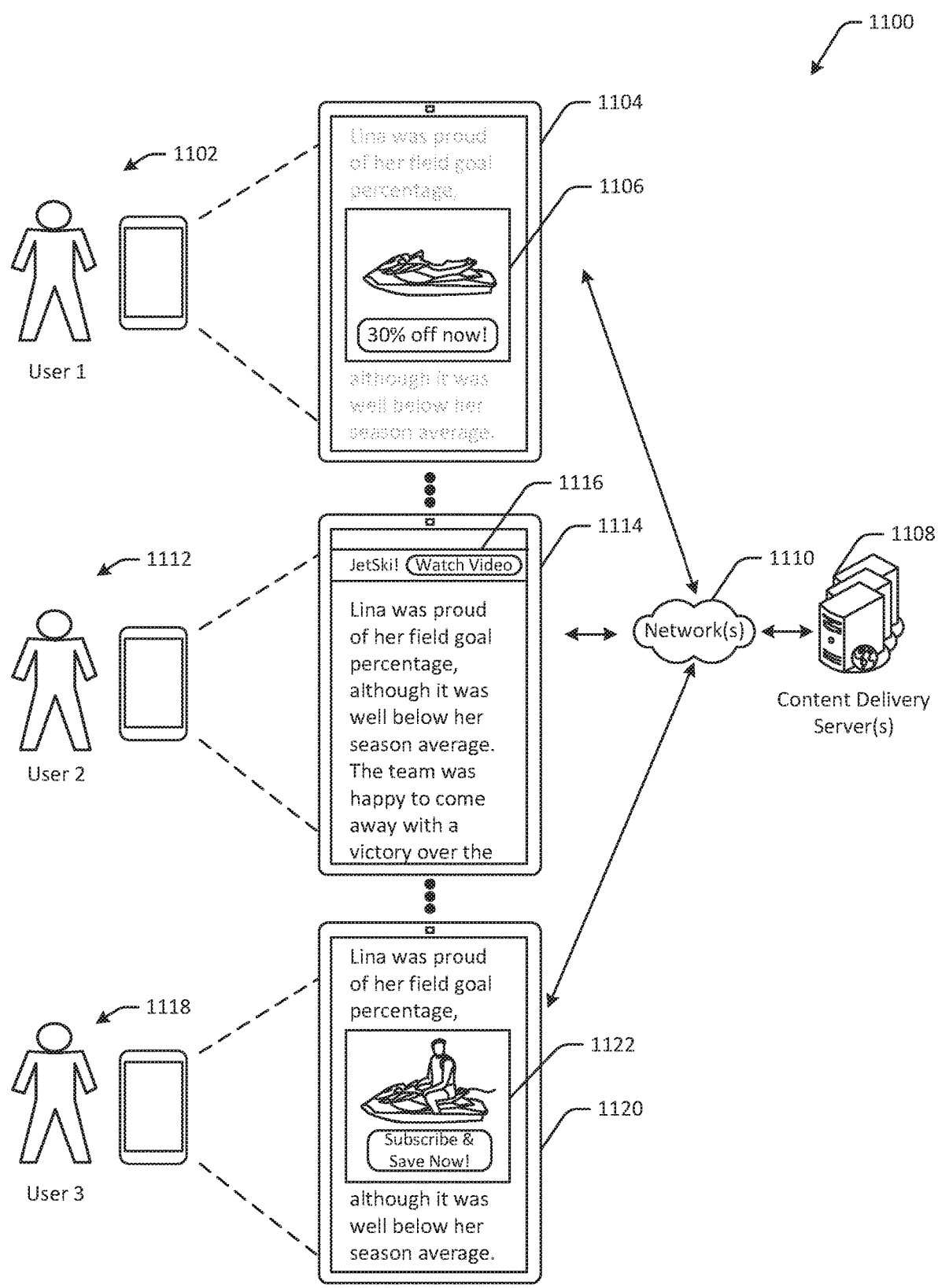
FIG. 11 depicts example embodiments of rendered digital content impressions with dynamic functionality in accordance with one or more embodiments of the disclosure.
Figure 12:
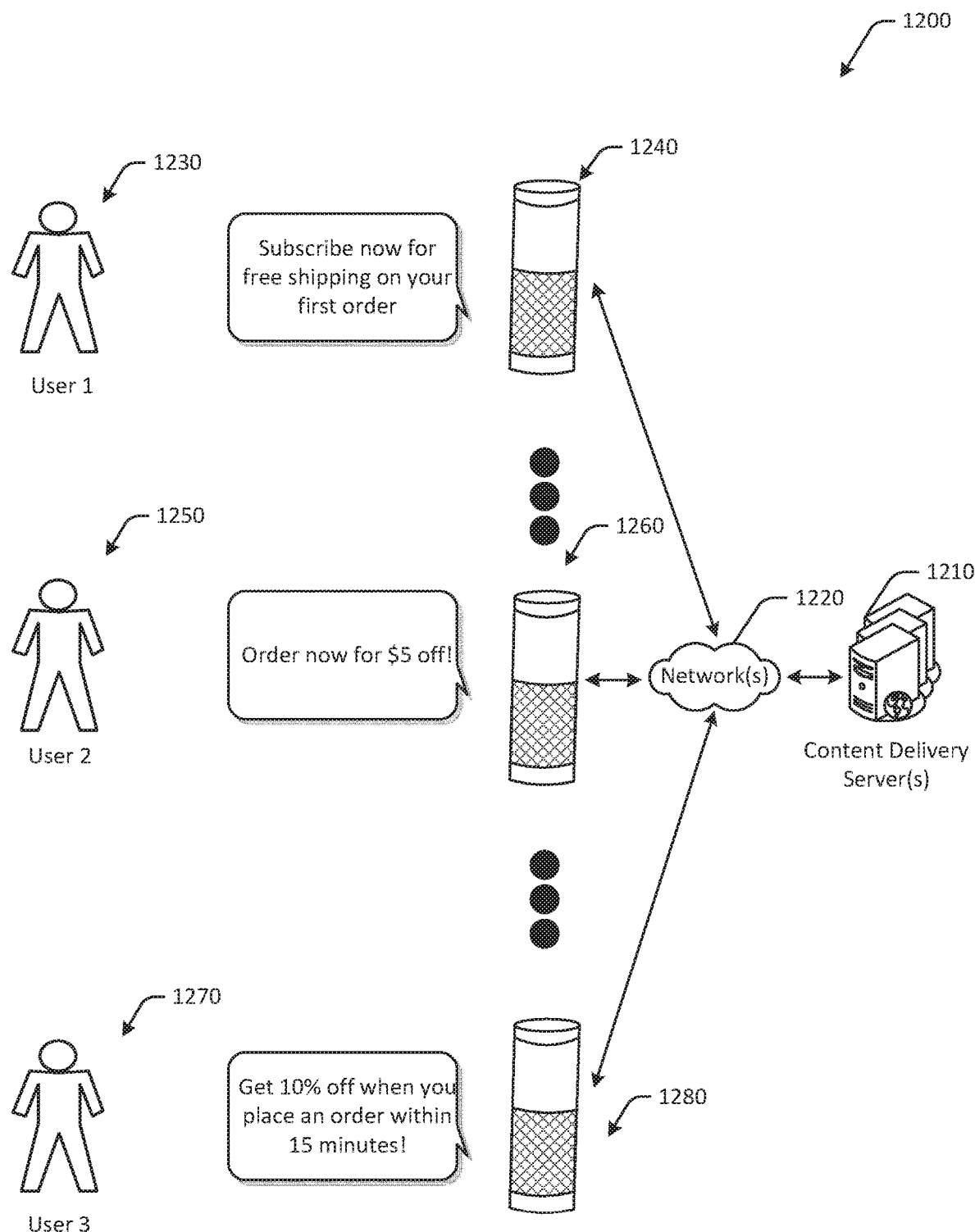
FIG. 12 depicts example embodiments of dynamically generated audio content in accordance with one or more embodiments of the disclosure.

FIG. 11 depicts example embodiments 1100 of rendered digital content impressions with dynamic functionality in accordance with one or more embodiments of the disclosure. FIG. 12 depicts example embodiments 1200 of dynamically generated audio content in accordance with one or more embodiments of the disclosure and will be discussed in conjunction with FIG. 11.

In FIG. 11, a user account of a first user 1102 may be associated with a first user device 1104 or a browsing session on the first user device 1104. The first user 1102 may be browsing content on the first user device 1104. A content delivery slot may be available at the content being rendered at the first user device 1104. A first content impression 1106 of a content delivery campaign may be served at the content delivery slot. The first content impression 1106 may be a popup ad and may be overlaid on rendered content. The rendered content may be blurred, appear translucent, or may be less visible until the content is consumed or exited. The first content impression 1106 may be received from, for example, one or more content delivery servers 1108 via one or more networks 1110. The first content impression 1106 may include dynamic functionality, such as an offer for 30% off a product with a button or link to purchase the product. The dynamic functionality may be determined by the content delivery server 1108 and may be based at least in part on the user account associated with the first user device 1104. A product identifier, such as a product image, may be included in the first content impression 1106, and may be unique to the first user 1102, or may be selected based at least in part on user preferences of the first user 1102. For example, the first content impression 1106 may include an image of a jet ski that may be of a certain color and may not include a rider or model on the jet ski.

A second user account may be associated with a second user 1112. The second user 1112 and/or the second user account may be associated with a second user device 1114 or a browsing session on the second user device 1114. A second content impression 1116 associated with the content delivery campaign may be served at an available content delivery slot at the second user device 1114. The second content impression 1116 may include dynamic functionality that may be determined by the content delivery server 1108 and sent to the second user device 1114 via the one or more networks 1110. The second content impression 1116 may be a banner ad with functionality that triggers playback of a video. For example, the second content impression 1116 may include a button to watch a video. The video may be played as a popup or the browser may be redirected to another site to play the video, in example embodiments. The dynamic functionality for the second content impression 1116, that of video playback, may be associated with the content delivery campaign, and may be selected or determined based at least in part on the user account and/or user preferences of the second user 1112. For example, videos may lead to conversions for the second user 1112 based on an analysis of a user profile of the second user. A product identifier, such as a brand logo or product logo, may be included in the second content impression 1116, and may be unique to the second user 1112, or may be selected based at least in part on user preferences of the second user 1112. For example, the second content impression 1116 may include a logo of a brand or certain jet ski.

A third user account may be associated with a third user 1118. The third user 1118 and/or the third user account may be associated with a third user device 1120 or a browsing session on the third user device 1120. A third content impression 1122 associated with the content delivery campaign may be served at an available content delivery slot at the third user device 1120. The third content impression 1122 may include dynamic functionality that may be determined by the content delivery server 1108 and sent to the third user device 1120 via the one or more networks 1110. The third content impression 1122 may be an inline ad with functionality related to a subscribe and save offer. For example, the third content impression 1122 may include a button to trigger a subscription. The dynamic functionality for the third content impression 1122 may be associated with the content delivery campaign, and may be selected or determined based at least in part on the user account and/or user preferences of the third user 1118. A product identifier, such as a product image, may be included in the third content impression 1122, and may be unique to the third user 1118, or may be selected based at least in part on user preferences of the third user 1118. For example, the third content impression 1122 may include an image of a jet ski that may be of a certain color and may include a rider or model on the jet ski.

While each of the first, second, and third content impressions 1106, 1116, 1122 may be associated with the same content delivery campaign, the dynamic functionality may allow for specific or customized offers and/or functionality to be presented to certain users. As a result, campaign performance may be improved. Each impression may also include different product identifiers, which may be selected based at least in part on the users to whom the impression will be served.

User interaction may be monitored and/or determined after impressions are served. For example, if a user interacts with an impression or the related dynamic functionality indicator, the dynamic functionality may be initiated in response to the user interaction.

In FIG. 12, example embodiments 1200 of dynamically generated audio content in accordance with one or more embodiments of the disclosure are depicted. One or more content delivery servers 1210 may communicate via one or more networks 1220. The content delivery server 1210 may communicate with a first streaming audio device 1240. The content delivery server 1210 may determine a user profile associated with the streaming audio device 1240. The user profile may be associated with a first user 1230. The content delivery server 1210 may determine that a content delivery slot is available, at which an audio segment can be presented to the first user 1230. The content delivery server 1210 may determine that the user account that is associated with the streaming audio device 1240 and/or the first user 1230 satisfies any applicable target segments or targeting criteria. The content delivery server 1210 may, in some embodiments, determine that the user profile associated with the streaming audio device is associated with a previous purchase of the product, which may indicate user familiarity with the product.

The content delivery server 1210 may generate and/or select a promotional offer for presentation as an audio segment based at least in part on the user profile. The content delivery server 1210 may deliver audio content including the promotional offer to the streaming audio device 1240. The promotional offer may be a dynamic functionality and may be, in the example of FIG. 12, an offer to subscribe with a promotion of free shipping on a first order.

In another example, a second user 1250 may be associated with a user account that is associated with a second streaming audio device 1260. The content delivery server 1210 may determine a promotional offer of a discount, such as $5 off a purchase, for audible presentation to the second user 1250.

In another example, a third user 1270 may be associated with a user account that is associated with a third streaming audio device 1280. The content delivery server 1210 may determine a promotional offer of a percentage discount that is time-based for audible presentation to the third user 1270.

In one embodiment, audible promotional offers may be determined by identifying a user account associated with a streaming audio device, and determining a purchase history associated with the user account. A determination may be made as to whether the purchase history includes the product that is being promoted, which may indicate that a user is familiar with the product. User familiarity may be beneficial for audible content because of the lack of a display or visual information.

The streaming audio devices and/or content delivery server 1210 may monitor or listen for audio input after presenting audio content, such as promotional offers. While monitoring, content playback may resume. Monitoring or listening may continue indefinitely or for a predetermined time interval, for example, if an offer expires in two minutes, listening may continue for two minutes. If an audible response is received, a determination may be made as to whether the audible response matches a predetermined keyword, phrase, or utterance. If there is a match indicating acceptance of an offer or other approval to take action, a purchase of a product or service, or another action may be initiated.

One or more operations of the method, process flows, or use cases of FIGS. 1-12 may have been described above as being performed by a user device, or more specifically, by one or more program module(s), applications, or the like executing on a device. It should be appreciated, however, that any of the operations of methods, process flows, or use cases of FIGS. 1-12 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-12 may be described in the context of the illustrative devices, it should be appreciated that such operations may be implemented in connection with numerous other device configurations.

The operations described and depicted in the illustrative methods, process flows, and use cases of FIGS. 1-12 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-12 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 13:
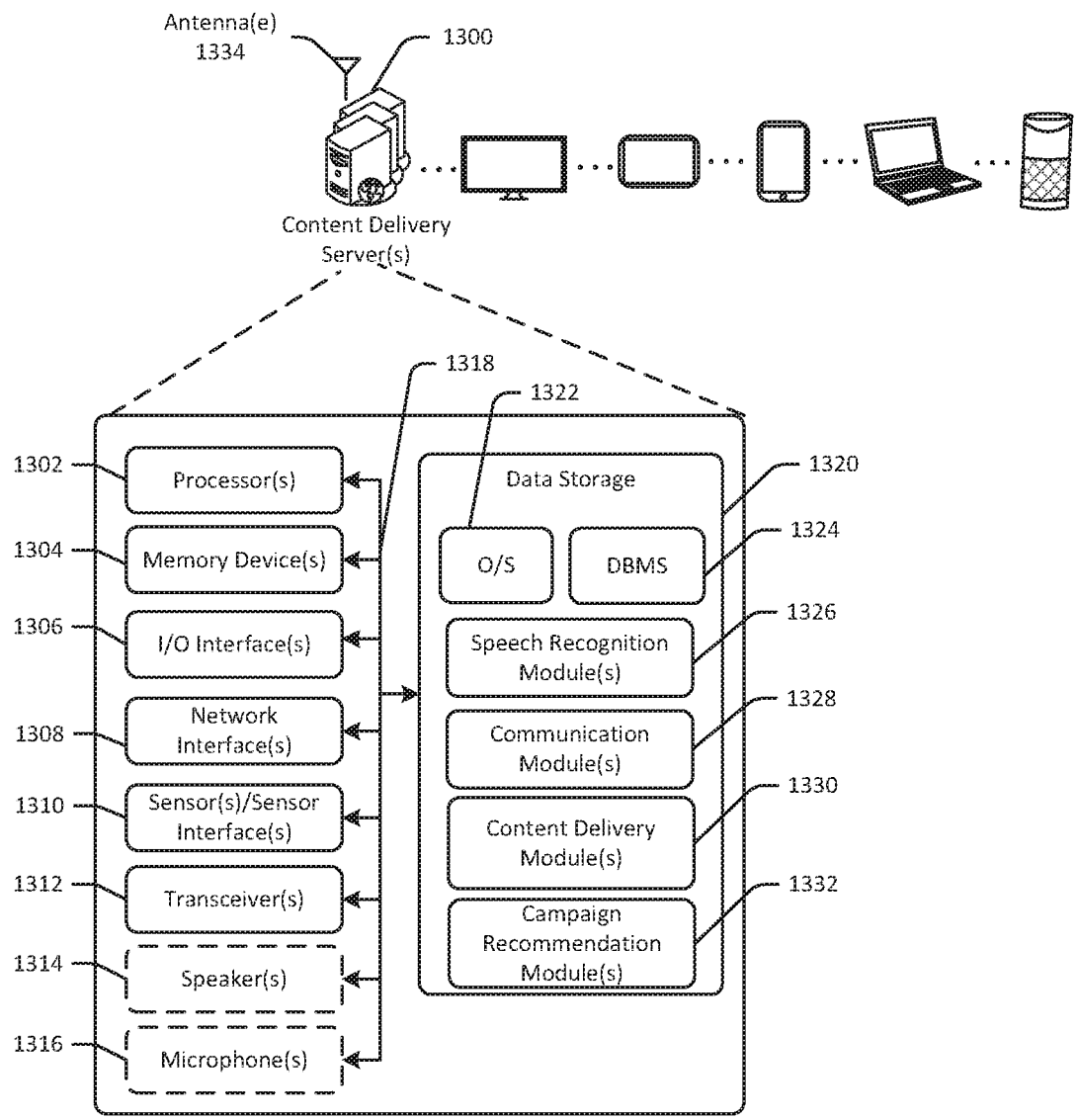
FIG. 13 schematically illustrates an example architecture of a system in accordance with one or more embodiments of the disclosure.

FIG. 13 is a schematic block diagram of one or more illustrative content delivery server(s) 1300 in accordance with one or more example embodiments of the disclosure. The content delivery server(s) 1300 may include any suitable computing device including, but not limited to, a server system, a mobile device such as a smartphone, tablet, e-reader, wearable device, or the like; a desktop computer; a laptop computer; a content streaming device; a set-top box; or the like. The content delivery server(s) 1300 may correspond to an illustrative device configuration for the campaign management servers of FIGS. 1-12.

The content delivery server(s) 1300 may be configured to communicate via one or more networks with one or more servers, user devices, or the like. The content delivery server(s) 1300 may be configured to actively or passively initiate and/or manage one or more aspects of a content campaign, such as content delivery parameters. The content delivery server(s) 1300 may be configured to deliver one or more pieces of content and may further be configured to engage in a bidding process for auctions to present content. In some embodiments, a single remote server or single group of remote servers may be configured to perform more than one type of content delivery functionality.

The content delivery server(s) 1300 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the content delivery server(s) 1300 may include one or more processors (processor(s)) 1302, one or more memory devices 1304 (generically referred to herein as memory 1304), one or more input/output ("I/O") interface(s) 1306, one or more network interface(s) 1308, one or more sensors or sensor interface(s) 1310, one or more transceivers 1312, one or more optional speakers 1314, one or more optional microphones 1316, and data storage 1320. The content delivery server(s) 1300 may further include one or more buses 1318 that functionally couple various components of the content delivery server(s) 1300. The content delivery server(s) 1300 may further include one or more antenna(e) 1334 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1318 may include at least one of a system bus, a memory bus, an address bus, or a message bus, and may permit exchange of information (e.g., data (including computer-executable code), signaling, etc.) between various components of the content delivery server(s) 1300. The bus(es) 1318 may include, without limitation, a memory bus or a memory controller, a peripheral bus, an accelerated graphics port, and so forth. The bus(es) 1318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1304 of the content delivery server(s) 1300 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1304 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1304 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1320 may include removable storage and/or non-removable storage including, but not limited to, magnetic storage, optical disk storage, and/or tape storage. The data storage 1320 may provide non-volatile storage of computer-executable instructions and other data. The memory 1304 and the data storage 1320, removable and/or non-removable, are examples of computer-readable storage media (CRSM) as that term is used herein.

The data storage 1320 may store computer-executable code, instructions, or the like that may be loadable into the memory 1304 and executable by the processor(s) 1302 to cause the processor(s) 1302 to perform or initiate various operations. The data storage 1320 may additionally store data that may be copied to memory 1304 for use by the processor(s) 1302 during the execution of the computer-executable instructions. Moreover, output data generated as a result of execution of the computer-executable instructions by the processor(s) 1302 may be stored initially in memory 1304, and may ultimately be copied to data storage 1320 for non-volatile storage.

More specifically, the data storage 1320 may store one or more operating systems (O/S) 1322; one or more database management systems (DBMS) 1324; and one or more program module(s), applications, engines, computer-executable code, scripts, or the like such as, for example, one or more speech recognition module(s) 1326, one or more communication module(s) 1328, and/or one or more campaign recommendation module(s) 1332. Some or all of these module(s) may be sub-module(s). Any of the components depicted as being stored in data storage 1320 may include any combination of software, firmware, and/or hardware. The software and/or firmware may include computer-executable code, instructions, or the like that may be loaded into the memory 1304 for execution by one or more of the processor(s) 1302. Any of the components depicted as being stored in data storage 1320 may support functionality described in reference to correspondingly named components earlier in this disclosure.

The data storage 1320 may further store various types of data utilized by components of the content delivery server(s) 1300. Any data stored in the data storage 1320 may be loaded into the memory 1304 for use by the processor(s) 1302 in executing computer-executable code. In addition, any data depicted as being stored in the data storage 1320 may potentially be stored in one or more datastore(s) and may be accessed via the DBMS 1324 and loaded in the memory 1304 for use by the processor(s) 1302 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 13, an example datastore(s) may include, for example, historical data for campaigns, inventory data, campaign performance data, and/or other information.

The processor(s) 1302 may be configured to access the memory 1304 and execute computer-executable instructions loaded therein. For example, the processor(s) 1302 may be configured to execute computer-executable instructions of the various program module(s), applications, engines, or the like of the content delivery server(s) 1300 to cause or facilitate various operations to be performed in accordance with one or more embodiments of the disclosure. The processor(s) 1302 may include any suitable processing unit capable of accepting data as input, processing the input data in accordance with stored computer-executable instructions, and generating output data. The processor(s) 1302 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1302 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1302 may be capable of supporting any of a variety of instruction sets.

Referring now to functionality supported by the various program module(s) depicted in FIG. 13, the speech recognition module(s) 1326 may include computer-executable instructions, code, or the like that responsive to execution by one or more of the processor(s) 1302 may perform functions including, but not limited to, monitoring for voice data or analog sound input, processing voice data, and/or sending or receiving voice data from a wirelessly connected device. The speech recognition module(s) 1326 may be configured to determine a meaning of detected or received voice data, as well as identify keywords.

The communication module(s) 1328 may include computer-executable instructions, code, or the like that responsive to execution by one or more of the processor(s) 1302 may perform functions including, but not limited to, communicating with remote servers, communicating with remote datastores, sending or receiving notifications, and the like.

The content delivery module(s) 1330 may include computer-executable instructions, code, or the like that responsive to execution by one or more of the processor(s) 1302 may perform functions including, but not limited to, generating content, initiating delivery of digital content and/or impressions, determining whether a content impression was served, determining whether a content impression was viewed or interacted with, determining conversion events, determining pixel location of served content, initiating computer-executable logic at user devices or other remote devices, and the like.

The campaign recommendation module(s) 1332 may include computer-executable instructions, code, or the like that responsive to execution by one or more of the processor(s) 1302 may perform functions including, but not limited to, determining base bid values, determining bid modifiers, determining viewability constraint statuses, and the like, identifying applicable campaign constraints, determining constraint compliance, determining shadow prices, determining error terms, and the like, generating product recommendations, digital product type recommendations, target segment recommendations, creative material recommendations, budget allocation recommendations, and the like.

Referring now to other illustrative components depicted as being stored in the data storage 1320, the O/S 1322 may be loaded from the data storage 1320 into the memory 1304 and may provide an interface between other application software executing on the content delivery server(s) 1300 and hardware resources of the content delivery server(s) 1300. More specifically, the O/S 1322 may include a set of computer-executable instructions for managing hardware resources of the content delivery server(s) 1300 and for providing common services to other application programs (e.g., managing memory allocation among various application programs). In certain example embodiments, the O/S 1322 may control execution of the other program module(s) to dynamically enhance characters for content rendering. The O/S 1322 may include any operating system now known or which may be developed in the future including, but not limited to, any server operating system, any mainframe operating system, or any other proprietary or non-proprietary operating system.

The DBMS 1324 may be loaded into the memory 1304 and may support functionality for accessing, retrieving, storing, and/or manipulating data stored in the memory 1304 and/or data stored in the data storage 1320. The DBMS 1324 may use any of a variety of database models (e.g., relational model, object model, etc.) and may support any of a variety of query languages. The DBMS 1324 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content delivery server(s) 1300 is a mobile device, the DBMS 1324 may be any suitable light-weight DBMS optimized for performance on a mobile device.

Referring now to other illustrative components depicted as being stored in the data storage 1320, the O/S 1322 may be loaded from the data storage 1320 into the memory 1304 and may provide an interface between other application software executing on the content delivery server(s) 1300 and hardware resources of the content delivery server(s) 1300. More specifically, the O/S 1322 may include a set of computer-executable instructions for managing hardware resources of the content delivery server(s) 1300 and for providing common services to other application programs (e.g., managing memory allocation among various application programs). In certain example embodiments, the O/S 1322 may control execution of one or more of the program module(s) depicted as being stored in the data storage 1320. The O/S 1322 may include any operating system now known or which may be developed in the future including, but not limited to, any server operating system, any mainframe operating system, or any other proprietary or non-proprietary operating system.

The DBMS 1324 may be loaded into the memory 1304 and may support functionality for accessing, retrieving, storing, and/or manipulating data stored in the memory 1304 and/or data stored in the data storage 1320. The DBMS 1324 may use any of a variety of database models (e.g., relational model, object model, etc.) and may support any of a variety of query languages. The DBMS 1324 may access data represented in one or more data schemas and stored in any suitable data repository. In certain example embodiments, the DBMS 1324 may be any suitable light-weight DBMS optimized for performance on a mobile device.

Referring now to other illustrative components of the content delivery server(s) 1300, the input/output (I/O) interface(s) 1306 may facilitate the receipt of input information by the content delivery server(s) 1300 from one or more I/O devices as well as the output of information from the content delivery server(s) 1300 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the content delivery server(s) 1300 or may be separate. The I/O devices may further include, for example, any number of peripheral devices such as data storage devices, printing devices, and so forth.

The I/O interface(s) 1306 may also include an interface for an external peripheral device connection such as universal serial bus (USB), FireWire, Thunderbolt, Ethernet port or other connection protocol that may connect to one or more networks. The I/O interface(s) 1306 may also include a connection to one or more of the antenna(e) 1334 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The content delivery server(s) 1300 may further include one or more network interface(s) 1308 via which the content delivery server(s) 1300 may communicate with any of a variety of other systems, platforms, networks, devices, and so forth. The network interface(s) 1308 may enable communication, for example, with one or more wireless routers, one or more host servers, one or more web servers, and the like via one or more of networks.

The antenna(e) 1334 may include any suitable type of antenna depending, for example, on the communications protocols used to transmit or receive signals via the antenna (e) 1334. Non-limiting examples of suitable antennas may include directional antennas, non-directional antennas, dipole antennas, folded dipole antennas, patch antennas, multiple-input multiple-output (MIMO) antennas, or the like. The antenna(e) 1334 may be communicatively coupled to one or more transceivers 1312 or radio components to which or from which signals may be transmitted or received.

As previously described, the antenna(e) 1334 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1334 may additionally, or alternatively, include a Wi-Fi antenna configured to transmit or receive signals in accordance with established standards and protocols, such as the IEEE 1002.11 family of standards, including via 2.4 GHz channels (e.g. 1002.11b, 1002.11g, 1002.11n), 5 GHz channels (e.g. 1002.11n, 1002.11ac), or 60 GHZ channels (e.g. 1002.11ad). In alternative example embodiments, the antenna(e) 1334 may be configured to transmit or receive radio frequency signals within any suitable frequency range forming part of the unlicensed portion of the radio spectrum.

The antenna(e) 1334 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1312 may include any suitable radio component(s) for—in cooperation with the antenna(e) 1334—transmitting or receiving radio frequency (RF) signals in the bandwidth and/or channels corresponding to the communications protocols utilized by the content delivery server(s) 1300 to communicate with other devices. The transceiver(s) 1312 may include hardware, software, and/or firmware for modulating, transmitting, or receiving—potentially in cooperation with any of antenna(e) 1334—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 1312 may further include hardware, firmware, or software for receiving GNSS signals. The transceiver(s) 1312 may include any known receiver and baseband suitable for communicating via the communications protocols utilized by the content delivery server(s) 1300. The transceiver(s) 1312 may further include a low noise amplifier (LNA), additional signal amplifiers, an analog-to-digital (A/D) converter, one or more buffers, a digital baseband, or the like.

The sensor(s)/sensor interface(s) 1310 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 1314 may be any device configured to generate audible sound. The microphone(s) 1316 may be any device configured to receive analog sound input or voice data.

It should be appreciated that the program module(s), applications, computer-executable instructions, code, or the like depicted in FIG. 13 as being stored in the data storage 1320 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the content delivery server(s) 1300, and/or hosted on other computing device(s) accessible via one or more networks, may be provided to support functionality provided by the program module(s), applications, or computer-executable code depicted in FIG. 13 and/or additional or alternate functionality. Further, functionality may be modularized differently such that processing described as being supported collectively by the collection of program module(s) depicted in FIG. 13 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 13 may be implemented, at least partially, in hardware and/or firmware across any number of devices.

It should further be appreciated that the content delivery server(s) 1300 may include alternate and/or additional hardware, software, or firmware components beyond those described or depicted without departing from the scope of the disclosure. More particularly, it should be appreciated that software, firmware, or hardware components depicted as forming part of the content delivery server(s) 1300 are merely illustrative and that some components may not be present or additional components may be provided in various embodiments. While various illustrative program module(s) have been depicted and described as software module(s) stored in data storage 1320, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-12 may be performed by a device having the illustrative configuration depicted in FIG. 13, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-12 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-12 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to at least one memory, an indication of a selection of a campaign goal for a content delivery campaign, wherein impressions of the content delivery campaign comprise dynamic functionality;
determining a user account associated with the selection;
generating a product recommendation for the content delivery campaign, wherein the product recommendation comprises a product identifier associated with the user account;
generating a target consumer recommendation for the content delivery campaign based at least in part on the campaign goal and historical data associated with the user account;
generating a digital product type recommendation for the content delivery campaign;
generating a creative content recommendation for digital impressions of the content delivery campaign, the creative content recommendation comprising automatically generated image, text, or audio content;
causing presentation of a content delivery campaign package at a user device after receiving the selection of the campaign goal;
determining that a user performed a single-action in response to the presentation of the content delivery campaign package;
initiating the content delivery campaign in response to the single-action;
determining a first functionality to automatically include with a first digital impression of the content delivery campaign, wherein the first functionality comprises at least one of initiating a discount, initiating a subscription, initiating a download, initiating a browser redirection, or selecting a promotional offer;
determining a second functionality to automatically include with a second digital impression of the content delivery campaign, wherein the second functionality comprises at least one of initiating a discount, initiating a subscription, initiating a download, initiating a browser redirection, or selecting a promotional offer;

determining that a second conversion rate associated with the second functionality is greater than a first conversion rate associated with the first functionality; and selecting the second functionality to include with a third digital impression of the content delivery campaign.

2. The method of claim 1, further comprising:

determining a global budget value for the content delivery campaign;

determining a flight time for the content delivery campaign; and determining an available supply of digital product types during the flight time;

wherein generating the digital product type recommendation for the content delivery campaign comprises generating the digital product type recommendation for the content delivery campaign based at least in part on the global budget value, the flight time, and the available supply.

3. The method of claim 1, wherein generating a digital product type recommendation for the content delivery campaign comprises determining a first digital product type, the method further comprising:

determining a global budget value for the content delivery campaign; and generating a budget allocation recommendation for the first digital product type based at least in part on the global budget value.

4. The method of claim 1, further comprising:

determining the first conversion rate for the first functionality; and determining the second conversion rate for the second functionality.

5. The method of claim 1, further comprising:

delivering the first digital impression of a first digital product type;

delivering the second digital impression of a second digital product type;

determining the first conversion rate for the first digital product type;

determining the second conversion rate for the second digital product type;

determining that the second conversion rate is greater than the first conversion rate; and reallocating a budget amount from the first digital product type to the second digital product type.

6. The method of claim 1, further comprising:

receiving a product selection for a product to include in the content delivery campaign;

wherein generating the product recommendation for the content delivery campaign comprises:

determining products related to the product selection;

determining an inventory level for the respective products; and generating the product recommendation based at least in part on the products and the inventory level.

7. The method of claim 1, further comprising:

determining a user category associated with the user account;

determining a set of one or more users in the user category; and determining historical sales information associated with respective users of the set of one or more users;

wherein generating the target consumer recommendation for the content delivery campaign comprises generating the target consumer recommendation for the content delivery campaign based at least in part on the campaign goal, the historical data associated with the user account, and the historical sales information.

8. The method of claim 1, further comprising:

receiving a product selection for a product to include in the content delivery campaign;

generating a set of one or more product identifiers of products related to the product; and filtering the set of one or more product identifiers based at least in part on the target consumer recommendation, wherein the filtered set comprises the product identifier of the product recommendation.

9. The method of claim 1, further comprising:

delivering the first digital impression with the first functionality;

determining a user interaction with the first digital impression;

redirecting a first browser at a first user device to a landing page comprising first content that is determined based at least in part on the first functionality;

delivering the second digital impression with the second functionality that is different than the first functionality; and redirecting a second browser at a second user device to the landing page, wherein the landing page comprises second content that is determined based at least in part on the second functionality, wherein the second content comprises a promotional offer that is different than the first content.

10. The method of claim 1, wherein the content delivery campaign package cannot be modified by the user prior to initiation of the content delivery campaign.

11. The method of claim 1, wherein the indication of the selection of the campaign goal is received at a first user interface, and the single-action can be performed in response to an immediately subsequent user interface.

12. The method of claim 1, wherein the single-action is at least one of a voice-based action, a gesture-based action, or a tactile-based action.

13. A device comprising:

at least one memory that stores computer-executable instructions; and at least one processor configured to access the at least one memory and execute the computer-executable instructions to:

receive an indication of a selection of a campaign goal for a content delivery campaign, wherein impressions of the content delivery campaign comprise dynamic functionality;

determine a user account associated with the selection;

generate a product recommendation for the content delivery campaign, wherein the product recommendation comprises a product identifier associated with the user account;

generate a target consumer recommendation for the content delivery campaign based at least in part on the campaign goal and historical data associated with the user account;

generate a digital product type recommendation for the content delivery campaign;

generate a creative content recommendation for digital impressions of the content delivery campaign, the creative content recommendation comprising automatically generated image, text, or audio content;

cause presentation of a content delivery campaign package at a user device after receiving the selection of the campaign goal;

determine that a user performed a single-action in response to the presentation of the content delivery campaign package;

initiate the content delivery campaign in response to the single-action;

determine a first functionality to automatically include with a first digital impression of the content delivery campaign, wherein the first functionality comprises at least one of initiating a discount, initiating a subscription, initiating a download, initiating a browser redirection, or selecting a promotional offer;

determine a second functionality to automatically include with a second digital impression of the content delivery campaign, wherein the second functionality comprises at least one of initiating a discount, initiating a subscription, initiating a download, initiating a browser redirection, or selecting a promotional offer;

determine that a second conversion rate associated with the second functionality is greater than a first conversion rate associated with the first functionality; and select the second functionality to include with a third digital impression of the content delivery campaign.

14. The device of claim 13, wherein the at least one processor is further configured to access the at least one memory and execute the computer-executable instructions to:

determine the first conversion rate for the first functionality; and determine the second conversion rate for the second functionality.

15. The device of claim 13, wherein the at least one processor is further configured to access the at least one memory and execute the computer-executable instructions to:

deliver the first digital impression of a first digital product type;

deliver the second digital impression of a second digital product type;

determine the first conversion rate for the first digital product type;

determine the second conversion rate for the second digital product type;

determine that the second conversion rate is greater than the first conversion rate; and reallocate a budget amount from the first digital product type to the second digital product type.

16. The device of claim 13, wherein the content delivery campaign package cannot be modified by the user prior to initiation of the content delivery campaign, wherein the indication of the selection of the campaign goal is received at a first user interface, and the single-action can be performed in response to an immediately subsequent user interface, and wherein the single-action is at least one of a voice-based action, a gesture-based action, or a tactile-based action.

17. A method comprising:

receiving, by one or more computer processors coupled to at least one memory, an indication of a selection of a campaign goal for a content delivery campaign, wherein impressions of the content delivery campaign comprise dynamic functionality;

determining a user account associated with the selection;

generating a product recommendation for the content delivery campaign, wherein the product recommendation comprises a product identifier associated with the user account;

generating a target consumer recommendation for the content delivery campaign based at least in part on the campaign goal and historical data associated with the user account;

generating a digital product type recommendation for the content delivery campaign;

generating a creative content recommendation for digital impressions of the content delivery campaign, the creative content recommendation comprising automatically generated image, text, or audio content;

causing presentation of a content delivery campaign package at a user device after receiving the selection of the campaign goal;

determining a first functionality to automatically include with a first digital impression of the content delivery campaign, wherein the first functionality comprises at least one of initiating a discount, initiating a subscription, initiating a download, initiating a browser redirection, or selecting a promotional offer;

determining a second functionality to automatically include with a second digital impression of the content delivery campaign, wherein the second functionality comprises at least one of initiating a discount, initiating a subscription, initiating a download, initiating a browser redirection, or selecting a promotional offer;

determining that a second conversion rate associated with the second functionality is greater than a first conversion rate associated with the first functionality;

selecting the second functionality to include with a third digital impression;

determining that a user performed a single-action in response to the presentation of the content delivery campaign package; and initiating the content delivery campaign in response to the single-action.

18. The method of claim 17, further comprising:

determining a global budget value for the content delivery campaign;

determining a flight time for the content delivery campaign; and determining an available supply of digital product types during the flight time;

wherein generating the digital product type recommendation for the content delivery campaign comprises generating the digital product type recommendation for the content delivery campaign based at least in part on the global budget value, the flight time, and the available supply.

19. The method of claim 17, wherein generating a digital product type recommendation for the content delivery campaign comprises determining a first digital product type, the method further comprising:

determining a global budget value for the content delivery campaign; and generating a budget allocation recommendation for the first digital product type based at least in part on the global budget value.

20. The method of claim 17, further comprising:
determining the first conversion rate for the first functionality; and
determining the second conversion rate for the second functionality.

\* \* \* \* \*